(12) United States Patent
Stott

(10) Patent No.: US 9,940,182 B1
(45) Date of Patent: Apr. 10, 2018

(54) BUSINESS RULE ENGINE VALIDATION SYSTEMS AND RELATED METHODS

(71) Applicant: Stott Creations LLC, Phoenix, AZ (US)

(72) Inventor: Eric Stott, Phoenix, AZ (US)

(73) Assignee: Stott Creations LLC, Phoenix, AZ (US)

( * ) Notice: Subject to any disclaimer, the term of this patent is extended or adjusted under 35 U.S.C. 154(b) by 354 days.

(21) Appl. No.: 14/850,846

(22) Filed: Sep. 10, 2015

Related U.S. Application Data

(63) Continuation-in-part of application No. 14/485,726, filed on Sep. 13, 2014, which is a continuation-in-part of application No. 14/026,514, filed on Sep. 13, 2013.

(51) Int. Cl.

| | |
|---|---|
| *G06F 9/00* | (2006.01) |
| *G06F 9/54* | (2006.01) |
| *G06Q 30/00* | (2012.01) |
| *G06N 5/04* | (2006.01) |
| *G06F 17/24* | (2006.01) |
| *G06F 15/16* | (2006.01) |
| *G06Q 10/06* | (2012.01) |
| *G06Q 10/10* | (2012.01) |
| *G06F 9/44* | (2018.01) |

(52) U.S. Cl.
CPC .............. *G06F 9/546* (2013.01); *G06F 9/44* (2013.01); *G06F 15/16* (2013.01); *G06F 17/245* (2013.01); *G06N 5/046* (2013.01); *G06Q 10/06395* (2013.01); *G06Q 10/063114* (2013.01); *G06Q 10/10* (2013.01); *G06Q 30/018* (2013.01)

(58) Field of Classification Search
None
See application file for complete search history.

(56) References Cited

U.S. PATENT DOCUMENTS

| | | | | |
|---|---|---|---|---|
| 6,363,393 | B1 * | 3/2002 | Ribitzky | G06F 19/322 |
| 7,979,569 | B2 * | 7/2011 | Eisner | G06F 9/546 |
| | | | | 709/201 |
| 8,160,920 | B2 * | 4/2012 | Gerke | G06Q 10/06 |
| | | | | 705/7.36 |

(Continued)

OTHER PUBLICATIONS

"Creating Business Rules Using the Business Rule Composer," Online Microsoft Corporation Documentation, 2010, last accessed Nov. 13, 2014.

*Primary Examiner* — Gurkanwaljit Singh
(74) *Attorney, Agent, or Firm* — IPTechLaw

(57) ABSTRACT

Validation policy methods. Implementations may include generating a validation policy for a business rule engine (BRE) included in a computer of an application server system. The method may include generating an assertion rule to create an enumerator, generating an advancing rule that asserts the enumerator to the BRE as a fact, and generating one or more evaluation rules that includes a check format and error formatting function. The check format function may return a data value from the enumerator and include one or more validation patterns and corresponding validation functions that verify whether the data value corresponds with a pattern in the one or more validation patterns or validation functions. The error formatting function may generate an error message including the data value that fails to be verified which of the one or more validation patterns that was failed, and may display the error message on a computer interface.

16 Claims, 25 Drawing Sheets

(56) References Cited

U.S. PATENT DOCUMENTS

| | | | | |
|---|---|---|---|---|
| 8,543,447 B2* | 9/2013 | Corneil | ............... | G06Q 10/06 705/7.36 |
| 2002/0026630 A1* | 2/2002 | Schmidt | ................ | G06F 8/20 717/103 |
| 2002/0198727 A1* | 12/2002 | Ann | .................. | G06Q 10/06 705/348 |
| 2004/0143470 A1* | 7/2004 | Myrick | ............... | G06Q 10/06 705/7.36 |
| 2004/0167862 A1* | 8/2004 | Yabloko | ............... | G06N 5/02 706/55 |
| 2005/0119905 A1* | 6/2005 | Wong | ................. | G06Q 10/04 705/50 |
| 2006/0149560 A1* | 7/2006 | Podhajsky | ............ | G06F 8/10 717/106 |
| 2006/0224425 A1* | 10/2006 | Homann | ........... | G06Q 10/0637 705/7.36 |
| 2007/0022410 A1* | 1/2007 | Ban | ..................... | G06Q 10/06 717/136 |
| 2008/0215400 A1* | 9/2008 | Ban | ..................... | G06Q 10/06 705/7.22 |
| 2009/0064087 A1* | 3/2009 | Isom | ................... | G06F 8/10 717/101 |
| 2009/0143128 A1* | 6/2009 | Cautley | ............... | G07F 17/32 463/17 |
| 2009/0198550 A1* | 8/2009 | Brown | ............. | G06Q 10/06375 705/7.37 |
| 2010/0036699 A1* | 2/2010 | Merrifield, Jr. | ....... | G06Q 10/06 705/7.37 |
| 2010/0082381 A1* | 4/2010 | Merrifield, Jr. | ....... | G06Q 10/06 705/7.37 |
| 2010/0318395 A1* | 12/2010 | Corneil | ............... | G06Q 10/06 705/7.29 |
| 2013/0044749 A1* | 2/2013 | Eisner | ................ | G06F 9/546 370/392 |

* cited by examiner

FIG. 3

| Process | Status | BeginTime | EndTime | FirstName | LastName | CustomerNumber | ServiceBusinessName |
|---|---|---|---|---|---|---|---|
| ☐ NewApp | ✓ | 5/2/2013 2:25 PM | 5/2/2013 2:26 PM | Ottanta | Modella | 123456 | Off Ramp Extender |
| ☐ NewApp2 | ✓ | 2/2/2013 2:25 PM | 2/2/2013 2:26 PM | Ottanta | Modella | 123456 | Off Ramp Extender |
| ☐ NewApp2 | ✓ | 2/2/2013 2:27 PM | 2/2/2013 2:26 PM | Ottanta | Modella | 123456 | Pipeline Component |
| ☐ NewApp | ✓ | 5/2/2013 2:27 PM | 5/2/2013 2:35 PM | Jane | Doe | 789103 | On Ramp Extender |

ESB Dashboard

Begin Date: 1-1-2013    End Date: 6-5-2013    Status: [All]    Auto Refresh: ☑    Customer Number [ ]    Export    [Resubmit]    Search http://server-01/esb-dashboard/ProfClaims/Begin%20Date=1-1-2013+End%20Date=6-5-2013+CustomerNumber=All+Status=All

| Web Browser -- ESB Dashboard | | | | | | | | X |
|---|---|---|---|---|---|---|---|---|
| http://server-01/esb-dashboard/ProfClaims/Begin%20Date=1-1-2013+End%20Date=6-5-2013+CustomerNumber=All+Status=Error | | | | | | | | |

ESB Dashboard

Begin Date: *1-1-2013*  End Date: *6-5-2013*  Status: [Error ▼]  Auto Refresh: [✓]  [Customer Number]  [Search]

[Export]   [- - Resubmit - -] ~ 120

| ☐ | Process | Status | BeginTime | EndTime | FirstName | LastName | CustomerNumber | ServiceBusinessName |
|---|---|---|---|---|---|---|---|---|
| ☐ | NewApp5 | ✗ | 4/2/2013 2:25 PM | | Ottanta | Modella | 123456 | Verify Customer No. |
| ☐ | NewApp12 | ✗ | 1/2/2013 2:25 PM | | Ottanta | Modella | 123456 | Verify Order No. |
| ☐ | NewApp3 | ✗ | 6/2/2013 2:25 PM | | Ottanta | Modella | 123456 | Verify Order Quantity |
| ☐ | NewApp66 | ✗ | 3/2/2013 2:27 PM | | Jane | Doe | 789103 | Validate Data Format |

```
<ns0:File xmlns:ns0="http://StottCreations.com/SampleSchema">
  <ns0:Record>
    <ns0:Date>12241999</ns0:Date>
    <ns0:SSN>123-14-1234</ns0:SSN>
    <ns0:Amount>12345.67</ns0:Amount>
  </ns0:Record>
  <ns0:Record>
    <ns0:Date>13241999</ns0:Date>
    <ns0:SSN>1234-12-1234</ns0:SSN>
    <ns0:Amount>1234.5</ns0:Amount>
    <ns0:TooLong>12876568838726272882OVGLJMLJGUW</ns0:TooLong>
    <ns0:TooShort>3ED</ns0:TooShort>
  </ns0:Record>
  <ns0:Record>
    <ns0:Date>12321999</ns0:Date>
    <ns0:SSN>123-14-1234</ns0:SSN>
    <ns0:Amount>123.</ns0:Amount>
  </ns0:Record>
</ns0:File>
```

FIG. 31

'1234-12-1234' was invalid at line number: 9 position: 14, it did not match the format defined as: Social Security Number (ex: XXXX-XX-XXXX).

FIG. 32

BUSINESS RULE ENGINE VALIDATION SYSTEMS AND RELATED METHODS

CROSS REFERENCE TO RELATED APPLICATIONS

This document is a continuation-in-part application of U.S. Utility application Ser. No. 14/485,726 to Eric Stott entitled "Business Rule Engine Message Processing System And Related Methods," filed Sep. 13, 2014, now pending, which is a continuation-in-part application of U.S. Utility application Ser. No. 14/026,514, entitled "Enterprise Service Bus Business Activity Monitoring System and Related Methods" to Stott, et. al, which was filed on Sep. 13, 2013 (the '514 Application), now pending, the disclosures of each of which are hereby incorporated entirely herein by reference.

BACKGROUND

1. Technical Field

Aspects of this document relate generally to data processing systems and message processing systems, such as systems and methods relating to processing and validating data included in messages.

2. Background Art

Various systems have been construction to permit exchange of electronic data during processing of a wide variety of business and other transactions. For example, a customer may electronically create a purchase order and forward an electronic copy of the purchase order to a vendor. The vendor's electronic data processing system then receives the electronic copy and processes it using the system that carries out various internally established checks and verifications of the data in the purchase order before forwarding the purchase order to company employees who then fill the order. The vendor's electronic data processing system is involved in tracking the various transactions involving the purchase order throughout the order fulfillment and invoicing process. A wide variety of systems and methods have been devised to handle many different transactions, including financial, business, ordering, health care, and other industries that involve data exchange between two parties. An example of an electronic processing data processing system is the system and software marketed under the tradename BIZTALK by Microsoft Corporation of Redmond, Wash.

SUMMARY

Implementations of a method creating a validation policy may include generating a validation policy for use with a business rule engine (BRE) where the BRE is included in a computer associated with an application server system. The method may include generating an assertion rule included in the validation policy to create an enumerator, generating an advancing rule included in the validation policy that asserts the enumerator to the BRE as a fact, and generating one or more evaluation rules included in the validation policy where each of the one or more evaluation rules includes a check format function and an error formatting function. The check format function may be configured to use an XPath statement to return one or more data values from the enumerator and may further include one or more validation patterns and a corresponding one or more validation functions that are configured to verify whether the one or more data values returned correspond with a pattern included in one of the one or more validation patterns or the one or more validation functions. The error formatting function may be configured to, in response to one or more of the one or more data values failing to be verified by the check format function, generate an error message including the one or more of the one or more data values that failed to be verified and an indication of which of the one or more validation patterns that was failed. The error formatting function may also be configured to generate a computer interface to display the error message.

Implementations of the method of creating a validation policy may include one, all, or any of the following:

The computer interface may be selected from the group consisting of a popup window, a formatted electronic message, a web page, a text message, or any combination thereof.

The one or more evaluation rules may include vocabulary items.

The vocabulary items may include the one or more validation patterns and the one or more validation functions.

The validation patterns may be selected from the group consisting of telephone number formats, credit card number formats, time formats, date formats, Internet Protocol (IP) address formats, email address formats, social security number formats, employer identification number formats, postal code formats, or any combination thereof.

The validation functions may be selected from the group consisting of checking data formats, checking data length, checking data maximum length, checking, data minimum length, XPath statements, or any combination thereof.

The error formatting function may be a validation function included in the vocabulary items selected from the group consisting of creating format error information, creating length range error information, creating maximum length error information, creating minimum length error information, or any combination thereof.

The one or more validation patterns may be one of regular expressions or friendly expressions.

Implementations of a method of validating data in a message or a file may include receiving one of a message or a file from a computer associated with an application server system. In response to receiving, the method may include calling a validation policy using a BRE where the BRE is included in a computer associated with the application server system. The method may also include executing an assertion rule included in the validation policy on the one of the message or the file to load one or more data values included in the message or the file into an enumerator. The method may also include executing an advancing rule included in the validation policy to assert the one or more data values included in the enumerator to the BRE as a fact and executing one or more evaluation rules included in the validation policy where each of the one or more evaluation rules includes a check format function and an error formatting function. This may be done by executing an XPath statement included in the check format function to return one or more data values from the enumerator, verifying whether the one or more data values returned correspond with a patter corresponding with one or more of one or more validation patterns and one or more validation functions included in the check format function. In response to one or more data values failed to be validated by the check format function, the method may include generating an error message using the error formatting function where the error message includes the one or more data values that failed and an indication of which of the one or more validation patterns that failed. The method may also include generating a computer interface to display the error message.

Implementations of a method of validating data in a message or a file may include one, all, or any of the following:

The computer interface may be selected from the group consisting of a popup window, a formatted electronic message, a web page, a text message, or any combination thereof.

The one or more evaluation rules may include vocabulary items.

The vocabulary items may include the one or more validation patterns and the one or more validation functions.

The validation patterns may be selected from the group consisting of telephone number formats, credit card number formats, time formats, date formats, Internet Protocol (IP) address formats, email address formats, social security number formats, employer identification number formats, postal code formats, and any combination thereof.

The validation functions may be selected from the group consisting of checking data formats, checking data length, checking data maximum length, checking, data minimum length, XPath statements, or any combination thereof.

The error formatting function may be a validation function comprised in the vocabulary items selected from the group consisting of creating format error information, creating length range error information, creating maximum length error information, creating minimum length error information, or any combination thereof.

The one or more validation patterns may be one of regular expressions or friendly expressions.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIG. 3 is a diagram of another implementation of a computer interface showing a plurality of itinerary processes (first computer interface);

FIG. 4 is a diagram of another implementation of a computer interface showing a plurality of itinerary process each having an error status indicator;

FIG. 19 is a portion of a list of validation pattern implementations;

FIG. 31 illustrates the structure of a sample xml file containing records having social security numbers;

FIG. 32 is an illustration of a part of a computer interface including a portion of an error message.

DESCRIPTION

This disclosure, its aspects and implementations, are not limited to the specific components, assembly procedures or method elements disclosed herein. Many additional components, assembly procedures and/or method elements known in the art consistent with the intended ESB business activity monitoring systems will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such ESB business activity monitoring systems, and implementing components and methods, consistent with the intended operation and methods.

Figure 13:
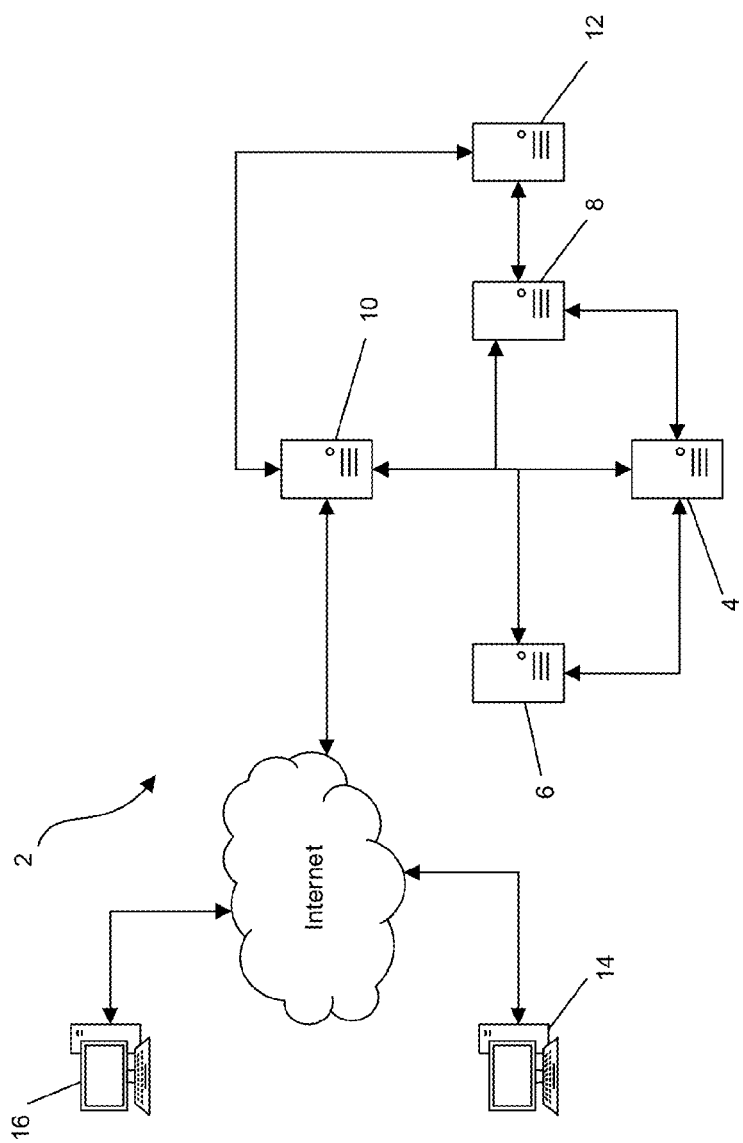
FIG. 13 is a block diagram of a hardware implementation of an ESB business activity monitoring system.

Referring to FIG. 13, an implementation of an enterprise service bus (ESB) business activity monitoring system 2 is illustrated. In the implementation of the system 2 illustrated, various servers and computers are illustrated being operatively coupled together through a telecommunications channel, which can include any of a wide variety of telecommunications channels including the internet. As illustrated, the system 2 includes a message box server 4 coupled to an itinerary server 6, business activity monitoring (BAM) server 8, and a web server 10. The BAM server 8 and the web server 10 are coupled to a caching server 12. The web server 10 is coupled to a developer computer 14 and to a user computer 16 via the internet. Many different hardware configurations may be used in various system implementations. In some implementations, all of the servers may exist as physically separate computing hardware units coupled together with various networking infrastructures and communication protocol. In others, all of the servers may exist as virtualized servers that all reside and operate on the same computer hardware unit. In others, a mixture of virtualized servers and physically separate computing hardware units may be coupled together using various networking infrastructures and communication protocols. Furthermore, while the developer computer 14 and the user computer 16 may be physically separate computing hardware units, one or both of them may take the form of a computing unit that accesses the function of the developer computer 14 and/or user computer 16 through use of remote access to a server or other workstation that is physically coupled to the system 2 or that exists as a virtual machine on a physical computing hardware unit. Those of skill in the art will readily appreciate the many possible combinations of physical and virtualized computer and server combinations that are possible using the teachings contained in this document.

A wide variety of ESB business activity monitoring systems that are operated by a wide variety of ESB and other business integration software products may be utilized by implementations of the system 2 and related methods disclosed herein. Examples of such systems include systems like the one marketed under the respective tradenames of IBM WEBSPHERE by International Business Machines, Inc., of Armonk, N.Y.; ORACLE ENTERPRISE SERVICE BUS by Oracle Corporation of Redwood Shores, Calif.; JBOSS ESB by Red Hat, Inc. of Raleigh, N.C.; and other ESB and business integration software products currently in existence or which may exist in the future. The various system implementations disclosed in this document are presented in the context of the ESB and business integration software marketed under the tradename BIZTALK and BIZTALK ESB TOOLKIT by Microsoft Corporation. Disclosure regarding the structure, function, and operation of BIZTALK Server 2010 may be found in "BizTalk Server 2010 Documentation" ("2010 Server Documentation") found in the Help file associated with BIZTALK and downloadable from Microsoft, a copy of sections of which is submitted herewith and is hereby incorporated entirely herein by reference. Disclosure regarding the structure, function, and operation of BIZTALK ESB TOOLKIT version 2.1 may be found in "Microsoft BizTalk ESB Toolkit" ("ToolKit Documentation") found in the Help file associated with BIZTALK ESB TOOLKIT version 2.1, a copy of which is submitted herewith and is hereby incorporated entirely herein by reference. While these implementations are presented in the context of BIZTALK Server 2010, those of ordinary skill will readily be able to implement the principles disclosed herein using other ESB and business integration software products and other versions of BIZTALK Server, including BIZTALK Server 2009 and 2013.

Figure 1:
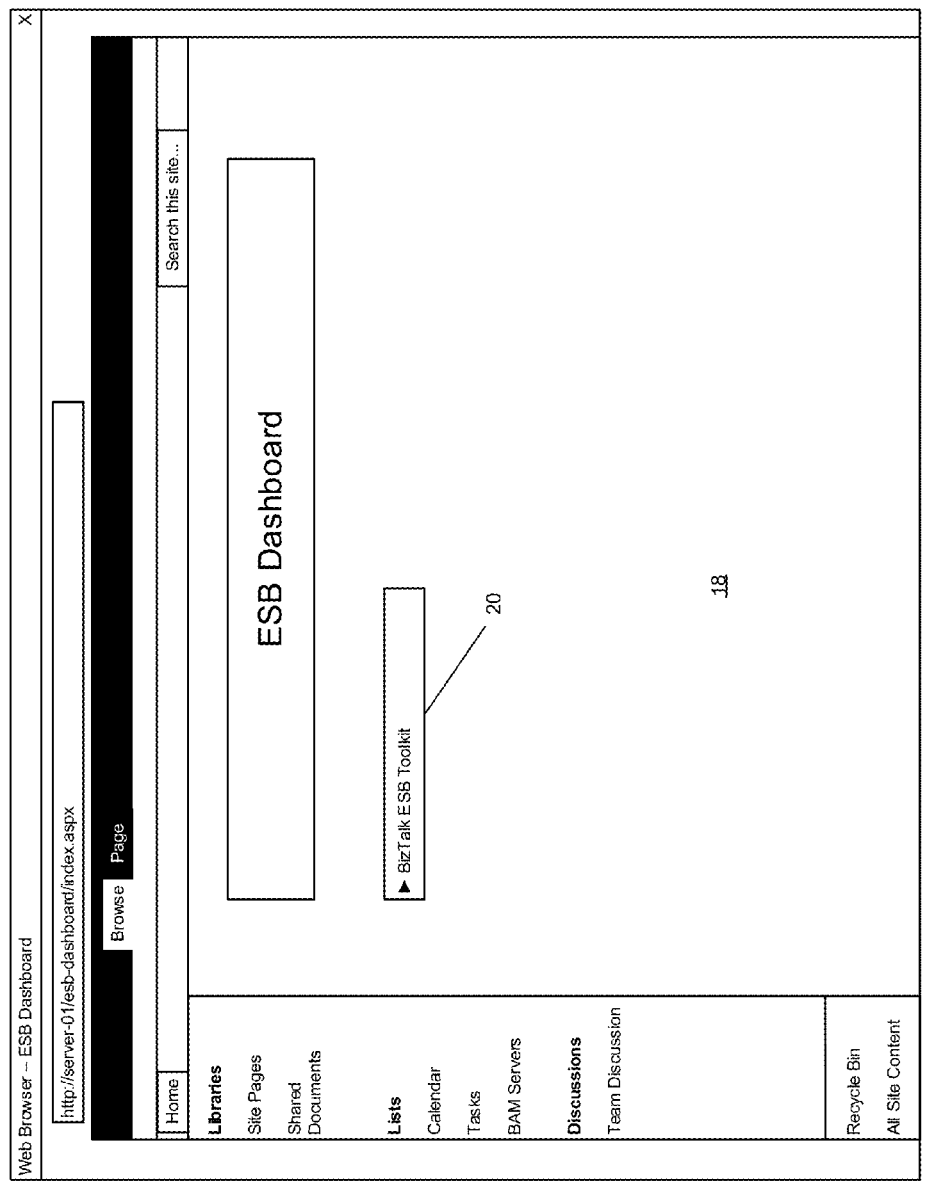
FIG. 1 is a diagram of an implementation of a computer interface.

Associated with user computer 16 and capable of being displayed on a display device coupled or included with user computer 16 is a computer interface 18. Referring to FIG. 1, an example of a computer interface 18 that is configured to be displayed on the display of the user computer 16 is illustrated. In the particular implementation illustrated in FIG. 1, the computer interface 2 is an interface constructed using web site software marketed under the tradename SHAREPOINT by Microsoft Corporation of Redmond, Wash. In other implementations, the interface may be constructed using any of a wide variety of web site software frameworks such as ASP.NET developed by Microsoft Corporation; the framework marketed under the tradename COLDFUSION by Adobe Corporation of San Jose, Calif.; PHP marketed by The PHP Group; and other web site software frameworks presently in existence or which may exist in the future.

Figure 2:
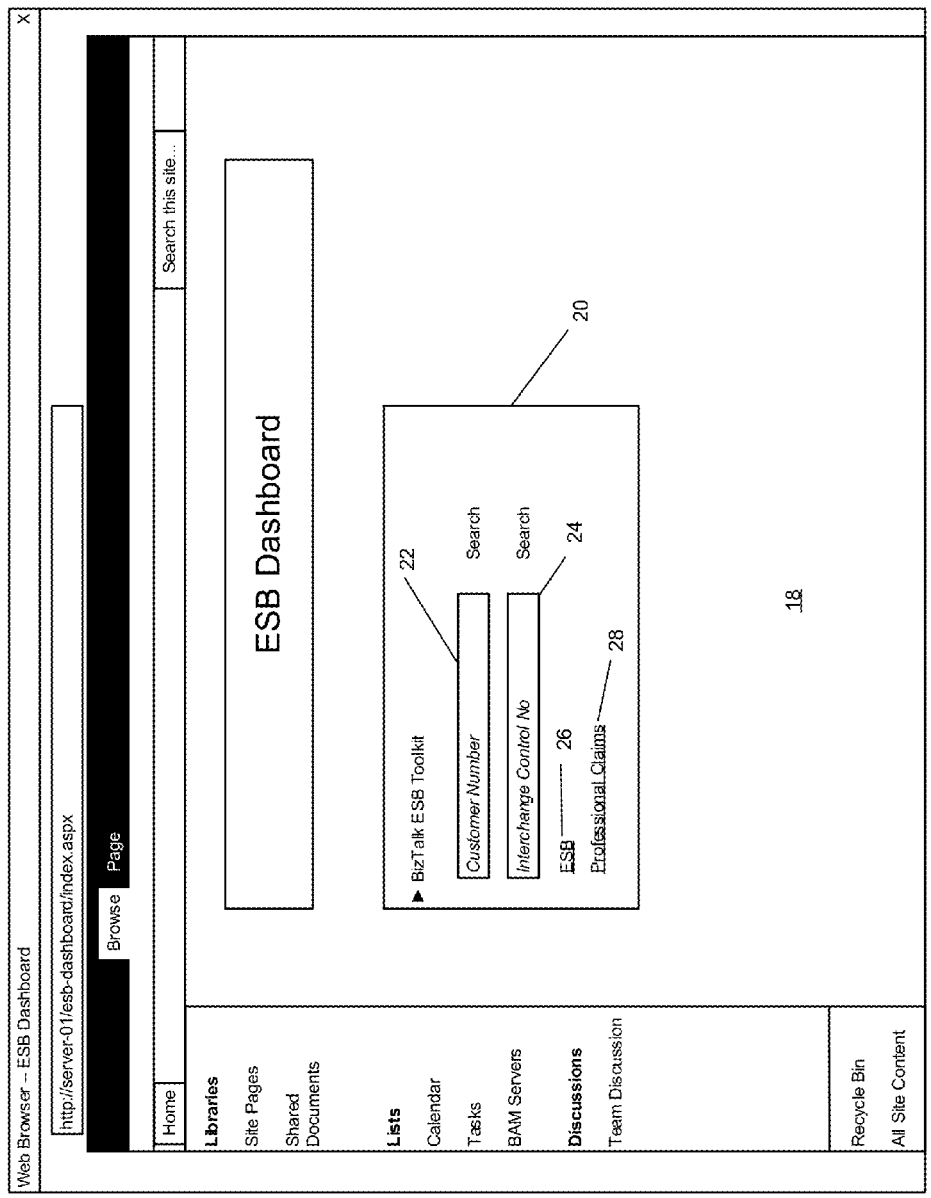
FIG. 2 is a diagram of the computer interface of FIG. 1 with the accordion expanded.

As illustrated, the computer interface 18 may be displayed and created by a web browser operating on the user computer 16 as the user computer 16 interacts with the web server 10 across the telecommunication channel. A wide variety of conventional web browsers may be employed including the browsers marketed under the tradenames INTERNET EXPLORER, FIREFOX, CHROME, and SAFARI by Microsoft Corporation; Mozilla of Mountain View, Calif.; Google, Inc., of Mountain View, Calif.; and Apple, Inc. of Cupertino, Calif., respectively. As illustrated, the computer interface 18 contains an accordion-style web form 20 labeled BizTalk ESB Toolkit. The accordion-style web form 20 is configured to expand when selected by the user through scripting or other client- or server-side programming to expose items listed under the particular heading which are related. Referring to FIG. 2, the accordion-style web form 20 is shown expanded. When expanded, the web form 20 shows four different possible views by which the user may access information regarding itinerary processes that are currently or have been operated by the system 2. In the interface illustrated in FIG. 2, two search forms 22, 24 are included which permit the user to find all itinerary process relating to a customer number or to an interchange control number. Two linked forms 26, 28 permit the user to click on a hyperlink to find itinerary processes currently running on the ESB (ESB) or all itinerary processes relating to the business process Professional Claims. When the user selects the linked forms 26, 28, another computer interface is generated by the user computer 16 and the web server 10 consistent with queries to databases automatically programmed to occur upon selection of the linked forms 26, 28.

Referring to FIG. 3, a computer interface 30 displayed when the user clicks on linked form 28 (Professional Claims) is illustrated. As illustrated, the interface 30 shows a plurality of itinerary processes listed in a table 32, each process having a status 34 and a hyperlink 36 associated with a name of the process. Presently, a status selector drop down web form indicates that the itinerary processes that will be displayed are those with all statuses in the system. The processes displayed are those that processed through the system 2 between dates set in the Begin Date and End Date indicated on the interface 30. The status 34 is indicated by a status indicator or icon that takes the form of a circle with a check mark in it, which is a completion status indicator. In various implementations the completion status indicator may take various colors, but in the implementation illustrated in FIG. 3 it is green. Additional information on the itinerary processes is included in the table 32, including a beginning time and ending time that the itinerary process began and ending processing on the system 2. The table 32 also includes specific information relating to each itinerary process that was logged during the processing of each itinerary process. In the table 32, the FirstName, LastName, and CustomerNumber were logged during processing.

The interface 30 also has additional features, including an Auto Refresh option, which, if checked, causes the user computer 16 to query the web server 10 for updates or the web server 10 to push updates to the user computer as the web server 10 receives the updates. Because of the large number of itinerary processes that may be being executed at one time or which may have been executed historically, the web server 10 may pull data regarding the itinerary processes from the caching server 12 initially, and then pull data from a BAM database associated with the BAM server 8 if the information cannot be found. The use of a caching server 12 that includes only a subset of the data in the BAM database permits functions like auto refresh to be performed without causing significant lags in performance. Examples of caching server systems that may be employed include the system marketed under the tradename APPFABRIC by Microsoft Corporation and other similar middleware software systems that presently or may in the future exist. The interface 30 also includes a search function similar to that in the interface 18 illustrated in FIG. 2 to allow the user to conduct a search by customer number.

The interface 30 includes a hyperlink 38 contained in the hyperlink window of the web browser being used to view the interface 30. In various implementations, the hyperlink 38 is constructed using Web 2.0 addressing which permits the hyperlink 38 to function as a query executable by the web server 10 to retrieve all the needed information to allow the user computer 16 to construct the interface 30 currently being viewed, including all the itinerary process data visible. This may permit a user viewing the interface 30 to send the hyperlink 38 to another user of the system so that when the other user selects the hyperlink 38, the interface 30 is reconstructed exactly as it originally appeared on a user computer associated with the other user. In addition, the interface 30 includes the capability to export the data shown in the Table 32 to another computer program, such as a spreadsheet, word processor, or other program for handling or parsing the data. The interface 30 also includes paging for tables that extend beyond the number of lines capable of being displayed in the table on a single page, and a page indicator 40 that permits the user to move from page to page.

Figure 5:
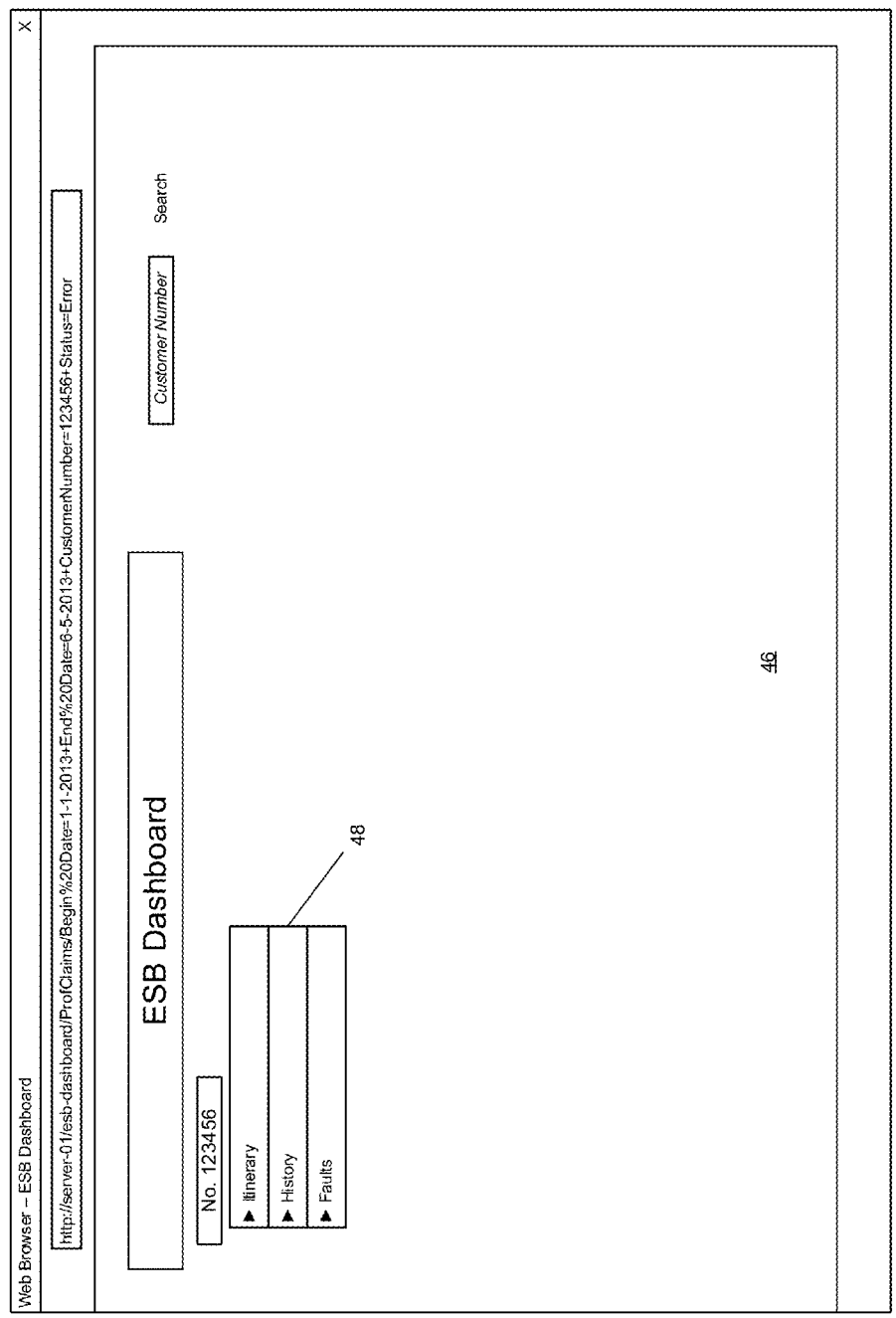
FIG. 5 is a diagram of another implementation of a computer interface showing an accordion list of information regarding a particular itinerary process (second computer interface) shown in an computer interface implementation like that illustrated in FIG. 4.

Referring to FIG. 5, an implementation of the computer interface 30 (first computer interface) is illustrated where the status selector is set to error, which means that all itinerary processes that have not been successfully completed due to an error or fault during processing by the system 2 are shown between the begin date and end date displayed on the interface 30 in table 44. The error indicator 42 is a circle with an X in it and is the color red. The ServiceBusinessName column of the table shows a name of a step within each particular itinerary process where the processing error or fault was encountered. As with the interface 30 in FIG. 4, when the user selects the hyperlink associated with the name of the process in the process column, another computer interface is configured to be constructed by the web server 10 and user computer 16 which contains specific information about the process, error information, and troubleshooting capabilities. Referring to FIG. 5, an example of such an interface 46 is illustrated, showing that specific information is contained in an accordion-style web form 48 that is adapted to display the information to the user in response to the user selecting a particular heading.

Each of the informational displays in the web form 48 on the interface 46 illustrated in FIG. 5 will be described in detail in this document. However, the description will benefit greatly from a detailed discussion of the portions of the system 2 involved in collecting and processing the data and the method implementations carried out the system 2 that permit such collection, processing, and display.

In an ESB business activity monitoring system implementation, the system 2 is configured to processes messages received from external computing systems or internal components of the system, process them, and route them to external computing systems or internal components of the system. As a system capable of supporting electronic data transport, processing, and routing, the ESB business activity monitoring system implementation permits transport of a wide variety of message types, including, by non-limiting example, electronic data interchange (EDI) documents, purchase orders, health insurance claims, and many other electronic business and other documents. Messages that arrive to be processed by the system 2 may be in any of a wide variety of formats disclosed in the 2010 Server Documentation and ToolKit Documentation previously incorporated by reference. Generally, messages include a data payload and one or more context properties associated with the message. The context properties are information about the message that the system can access without being required to parse the data in the data payload of the message.

Figure 12:
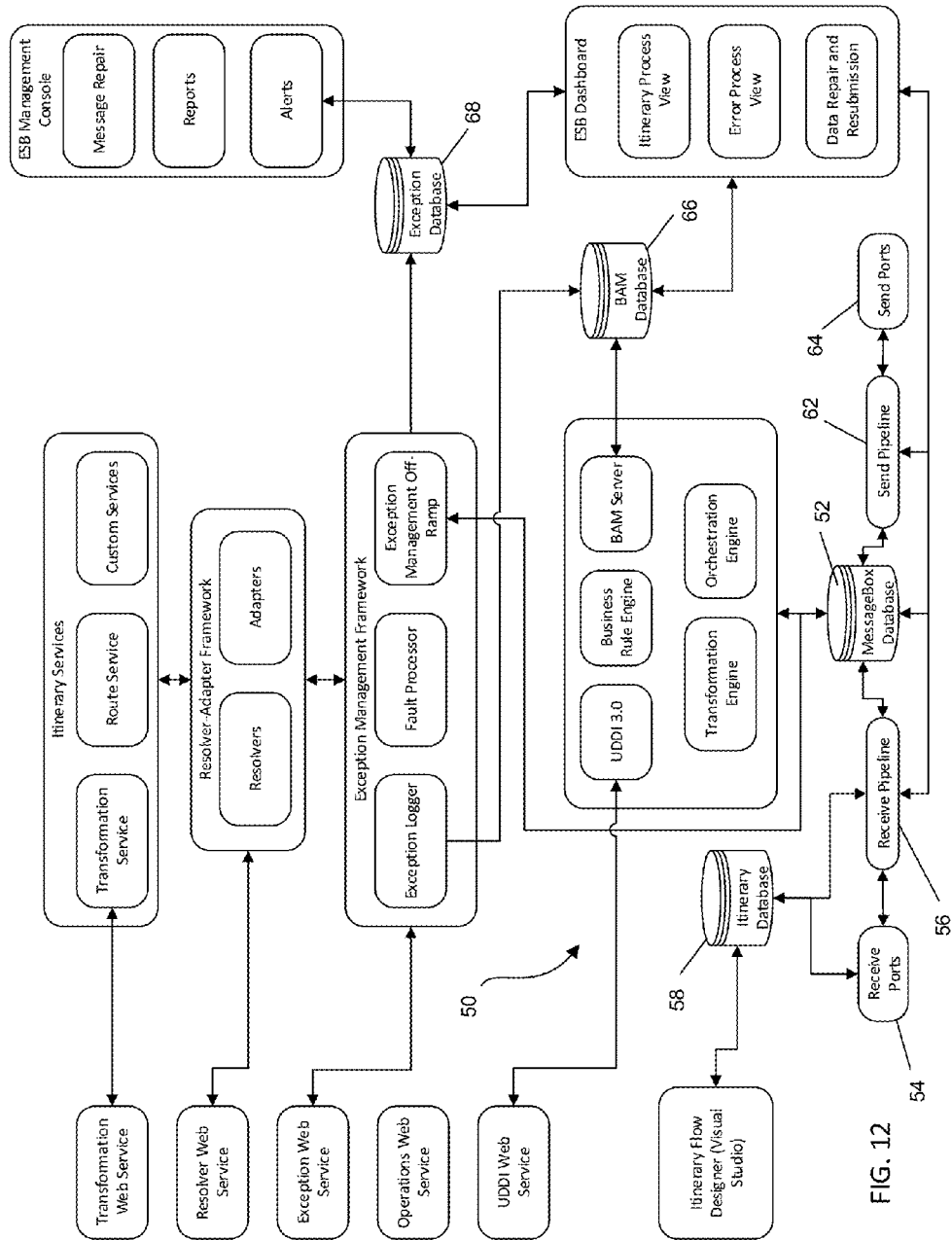
FIG. 12 is a flowchart of an implementation of an ESB business activity monitoring system.

Referring to FIG. 12, a block diagram of the various components of an ESB business activity monitoring system 50 are illustrated. As illustrated, at the heart of the system is the message box database 52 which is associated with and coupled with or included in the message box server 4. Messages enter the system through a receive port 54 and are passed to a receive pipeline 56. In the receive pipeline 56, the message type is evaluated. The message may include an itinerary, or a list of instructions of how to process the message with the components of the system 50 in a header of the message if the message includes a Simple Object Access Protocol (SOAP) header. Not all messages will include an itinerary, so the various processing components in the receive pipeline 56 query an itinerary database 58 via the itinerary server 6 coupled to the itinerary database 58 to determine the proper itinerary to use for the particular message type. The itineraries in the itinerary database 58 are created by a developer user who utilizes the developer computer 14 and an itinerary flow designer (like the visual designer marketed under the tradename VISUAL STUDIO by Microsoft Corporation) to construct the itinerary and save it to the itinerary database 58 via the web server 10.

Once the desired itinerary for the particular message is known, a component in the receive pipeline 56 will write the itinerary into one or more context properties associated with the data contained in the message. Once the itinerary is in the one or more context properties, it is available for use throughout the message's processing steps to the various components of the system 50. Once the itinerary for the message has been identified and written into the one or more context properties, the system 50 handles the message in one of two ways initially. If the itinerary indicates that the message needs to be processed via orchestration, the message will be forwarded by the receive pipeline and published (saved, written, placed) into the message box database 52.

Once the message has been published to the message box database, it is ready for processing by system components that have subscribed to the particular message type associated with the method according to the steps laid out in the itinerary written to the one or more context properties associated with the message. For example, the first step of the itinerary may include processing the message using an orchestration in an orchestration engine included in the message box server 4. An orchestration is one or more processing steps established by a designer that processes the message data. In a second step, the message box server 4 may be instructed by the itinerary to contact a transformation engine and have an orchestration perform a specific transformation of the data (in the case of an EDI document, map the data to a new map) or send the data to an off-ramp that performs the transformation (in a pipeline). A wide variety of system components may be involved in processing the message and retrieving and storing information need to process the message in orchestration processing. Relevant teachings regarding the system components, including business rule engines, transformation engines, UDDI 3.0 resources and related information may be found in the 2010 Server Documentation and ToolKit Documentation previously incorporated by reference. The process continues until the itinerary indicates that the message should be routed to a send pipeline 60 which, after performing any processing specified in the itinerary, forward the message to a send port 62 which routes the message to either an external system via a telecommunication network or back to another receive port 54 in the system 50 to be processed once more by the system 50.

If the itinerary indicates that the message is to be processed using messaging, the message will be published to the message box database during the processing of the itinerary and processing will take place in the receive pipeline 56 and in the send pipeline 62 which will call all of the needed system components as set out in the itinerary to process the message before it is forwarded to the send port 64.

During processing using orchestration and messaging, information about the message processing is logged by the BAM server 8 to BAM database 66 coupled to the BAM server 8. The information to be logged may include data from the message, whether from the one or more context properties, the data payload, data added to the one or more context properties, the data payload during processing of the message, or information about system components involved in the processing. As indicated in FIG. 12, some logging takes place by the message box server 4, such as logging of exceptions (faults or errors) during processing to an exception database 68 coupled with the message box server 4 through an exception management framework. Logging to the BAM database 66, however, in implementations of the system 50 occurs as indicated in the itinerary associated with a particular message being processed. The information to be logged is established by a designer during the design time for the particular itinerary before it is stored in the itinerary database 58. The data used to populate the computer interfaces 18, 30, and 46 is logged in the BAM database 66 during processing by system 50. The BAM server, 8, web server 10 and caching server 12 all operate in combination with the user computer 16 to supply the data from the BAM database 66 needed to create a particular version of the computer interface 18, 30, or 46 as requested by the user using the user computer 16.

Figure 14:
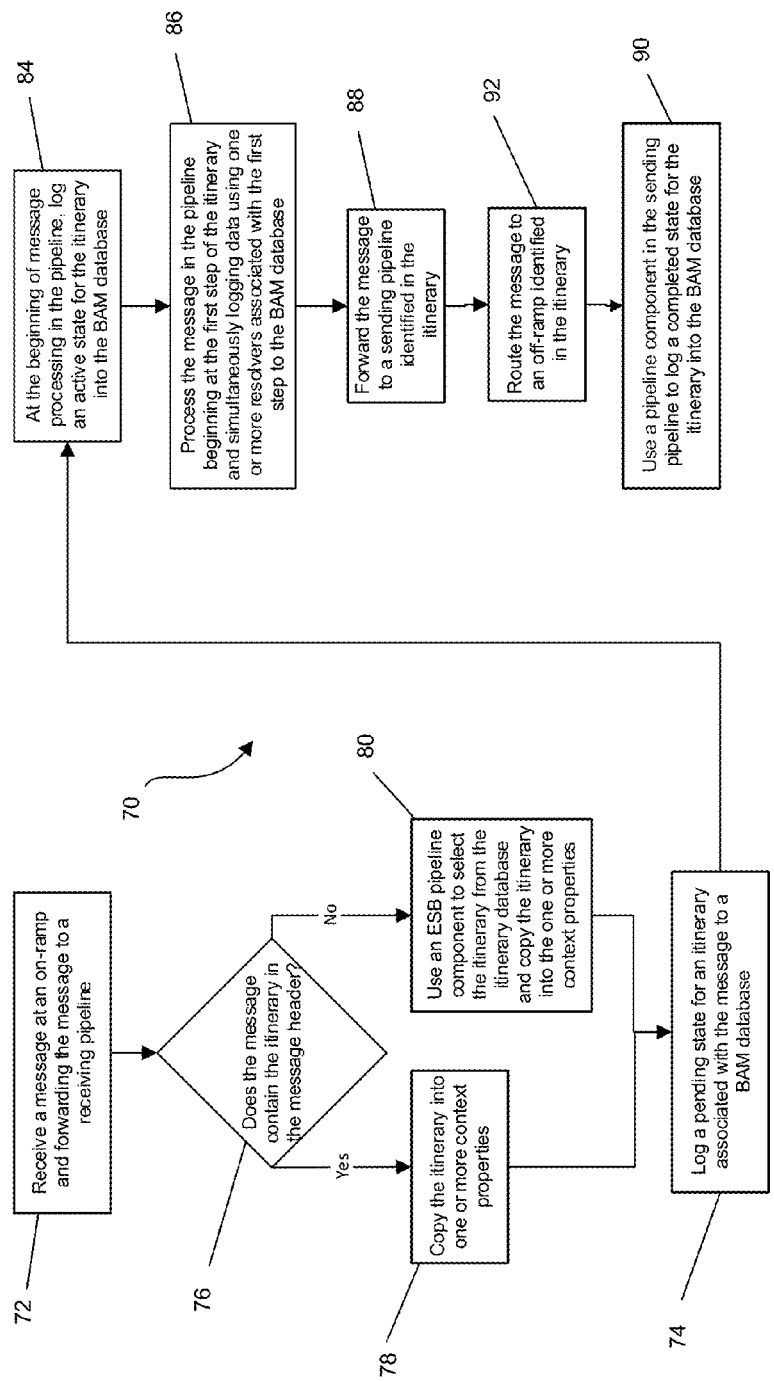
FIG. 14 is a flow chart of an implementation of a method of monitoring the activity of an enterprise service bus (ESB) business activity monitoring system.

The process of logging data to the BAM database 66 occurs in two different ways depending upon whether the processing of the message is messaging-based or orchestration-based. Referring to FIG. 14, for messaging-based processing, implementations of a method of monitoring the activity of an ESB business activity monitoring system 70 includes receiving using an on-ramp and a message box server coupled to the on-ramp a message (step 72). The on-ramp is the itinerary equivalent to receiving the message at a particular receive port 54 coupled to the message box server 4. The method 70 then includes logging a pending state for an itinerary process associated with the message to the BAM database 66 (step 74). In various implementations of the method, an itinerary process (and any step in an itinerary process) can have the following statuses: not invoked (represented by the color gray), pending (represented by the color yellow), active (represented by the color orange), complete (represented by the color green), informational (represented by the color blue), and error (represented by the color red). These statuses may be logged for the itinerary process and/or any step in the itinerary process depending upon how the itinerary has been constructed by the itinerary designer and saved to the itinerary database 58. These statuses may also be logged for itinerary processes regardless of the particular programming of the itinerary process and/or any step in the itinerary process being established through programming of the various system components designed to process messages (i.e., receiving ports, pipelines, orchestrations, etc.) Furthermore, the pending state for the itinerary may be logged before the message is fully examined for itinerary information or may be logged after the message has been fully examined for itinerary information. The latter situation is illustrated in FIG. 14, where the logging of the pending state occurs after the message has been fully examined for itinerary information. The receiving pipeline 56 then examines the message to determine if the message contains an itinerary in its header (step 76, which can occur if the message has a SOAP header). If it does, then the itinerary is copied into the one or more context properties associated with the message (step 78) and is now available to all system components that will process the message during the message's entire time spent being processed by the system 50.

Figure 11:
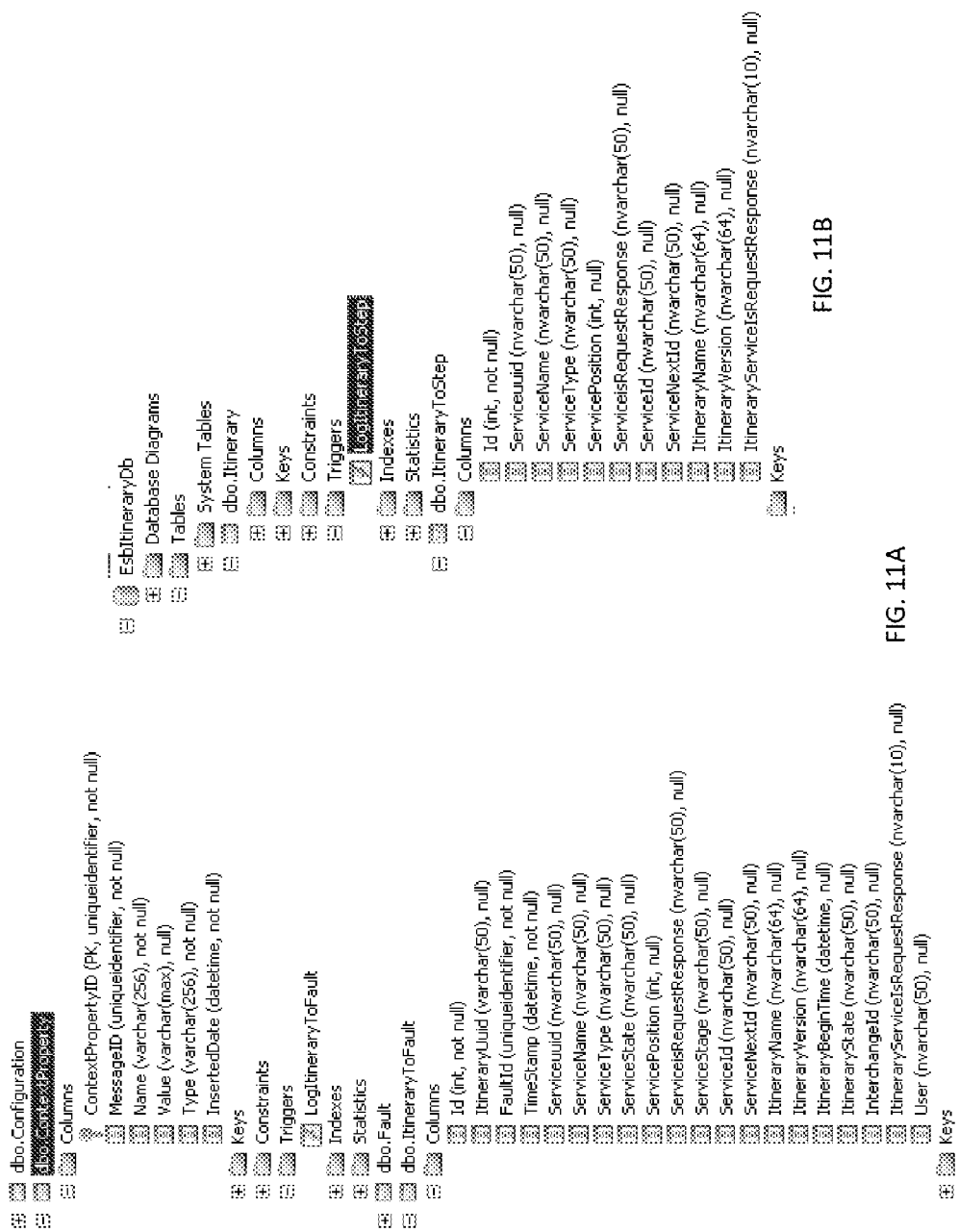
FIG. 11A is a portion of a database structure diagram showing relevant database structures for a log itinerary to fault database.
FIG. 11B is a portion of a database structure diagram showing relevant database structures for a log itinerary to step database along with a relevant trigger.

If the message does not have an itinerary associated with it in the header, then an ESB pipeline component in the receiving pipeline 56 selects the itinerary from the itinerary database (interacting with the itinerary server 6 in the process and using information about the message type to do so) and copies the itinerary associated with that particular message into the one or more context properties (step 80). Referring to FIG. 11B, a database structure diagram of an implementation of an itinerary database is illustrated, showing the structure of the database table dbo.ItineraryToStep to which the rows would be written. In these implementation, the trigger LogItineraryToStep is used to perform this function.

Figure 15:
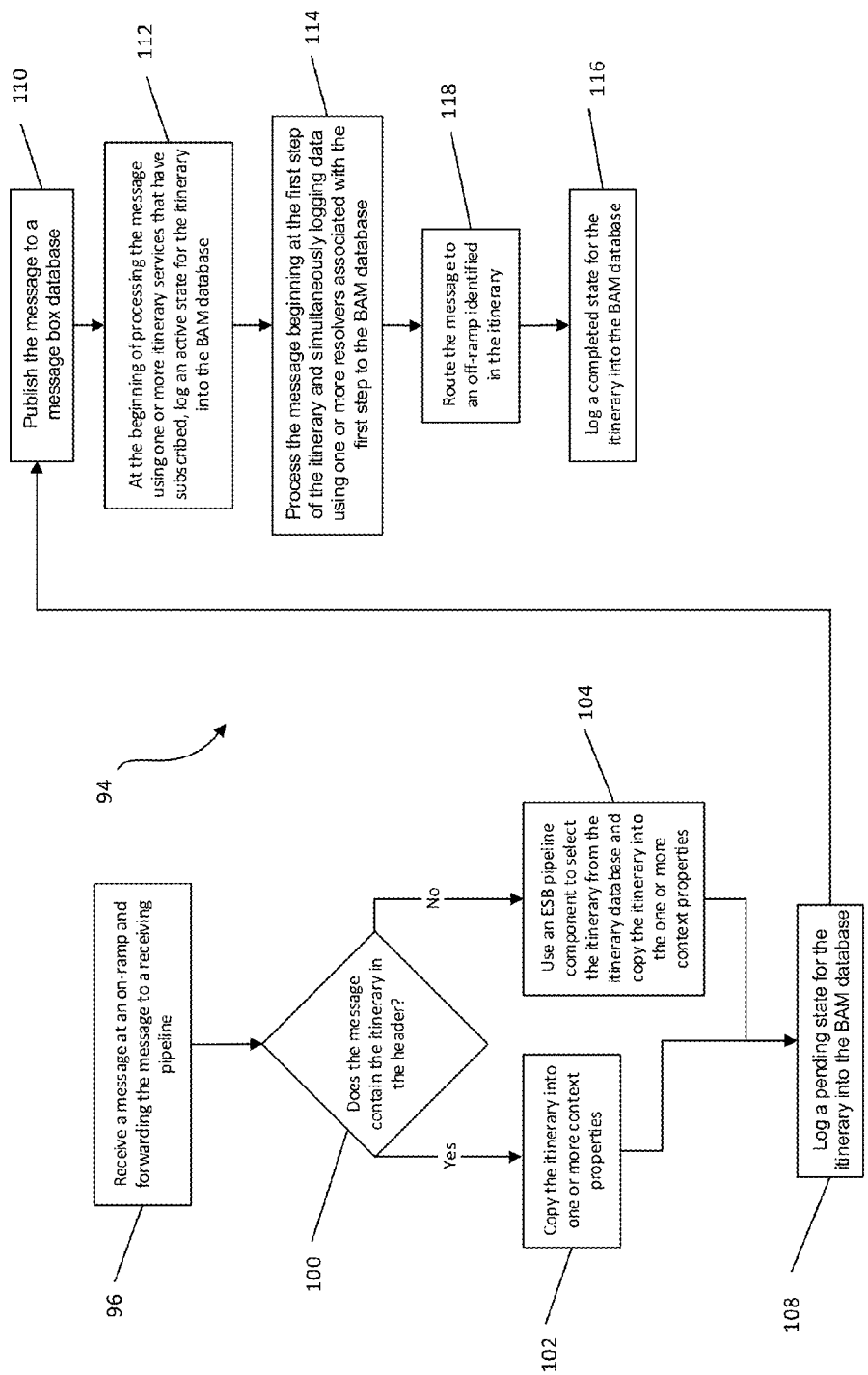
FIG. 15 is a flow chart of another implementation of a method of monitoring the activity of an ESB business activity monitoring system.

Since the processing of messages in the method 70 implementation illustrated in FIG. 14 illustrates processing for an itinerary that includes at least one messaging-based step, all message processing occur in the pipelines for that step, though in various method implementations orchestration-based processing may be used for other itinerary steps. Accordingly, as the message begins processing in the receive pipeline using system components in the pipeline, the active state for the itinerary is logged into the BAM database 66 (step 84), indicating that the itinerary process has moved from the pending status to the actively processing status. The message is then processed in the receive pipeline beginning at a first step in the itinerary. During processing, data is simultaneously being logged to the BAM database as indicated in one or more resolvers associated with the first step in the itinerary (step 86). The data to be logged is set up by the designer in each of the one or more resolvers during design time of the itinerary (which will be discussed in more detail herein). During processing of the first step (or a second step, or any subsequent step in the itinerary) the message is forwarded to the sending pipeline 62 identified in the itinerary (step 88). The message is then routed to an off-ramp (itinerary off-ramp) identified in the itinerary, which represents sending the message to a particular send port of the various send ports 64 of the system 50. This send port may send the message back to a particular receiving port for additional processing or may send the message to an external system. Following routing by the sending pipeline 62, a pipeline component in the sending pipeline 62 is used to log a completed state for the itinerary into the BAM database 66 (step 90).

Where the processing of the message is orchestration-based, the processing of the message does not all take place in a pipeline, but at least some of it occurs after the message has been published to the message box database 52 (as with the previous method 70 implementation, particular steps in the itinerary may be carried out using messaging-based processing as well). Referring to FIG. 15, an implementation of a method of monitoring the activity of an ESB business activity monitoring system 94 includes receiving a message at an on-ramp (receiving port 54) and forwarding the message to a receiving pipeline 56 (step 96). A component in the receiving pipeline 56 then evaluates the message to determine if the message contains the itinerary in the header (step 100). If it does, the receiving pipeline 56 copies the itinerary into one or more context properties of the message (step 102). If not, an ESB pipeline component (system component in the pipeline) is used along with the itinerary server 6 to select the itinerary for the message from the itinerary database 58 (using message type, etc.) and copy the itinerary into the one or more context properties (step 104). A pending state for the itinerary is then logged into the BAM database (step 108).

The message is then published to the message box database by the receiving pipeline 56 (step 110). Upon publication to the message box database, system components that subscribe to that particular message type now have the opportunity to begin processing the message. The itinerary in the one or more context properties of the message determines which subscribing system components will process the message and in what order. At the beginning of processing the message using one or more itinerary services (system components identified in the itinerary that have subscribed to this message type), an active state for the itinerary is logged into the BAM database (step 112). The message is then processed beginning at the first step of the itinerary while data identified to be logged by one or more resolvers associated with the first step of the itinerary is logged to the BAM database (step 114). Following processing of the first step (or after processing of a second or subsequent step in the itinerary), the message is routed to an itinerary off-ramp (sending port 64) identified in the itinerary (step 118). This off-ramp could send the message back to a receiving port (in the case of recursive processing of the message by the system 50) or other itinerary on-ramp or to an external system. This could be done by an orchestration, another system component that subscribes to the message, or in a sending pipeline 62. After the message has been routed to the off-ramp, a completed state is logged for the itinerary process in the BAM database (step 116).

In various implementations of the methods 70, 94, logging of pending, active, and completed states for the itinerary process involved in the message process into the BAM database 66 has been described. In particular implementations of the methods 70, 94, logging of pending, active, and completed states may be performed for each step in the itinerary as well. For example, following logging of the active state for the itinerary process and just prior to processing the first step of the itinerary, a pending state for the first step of the itinerary may be logged to the BAM database 66 using the BAM server 8. As the first step of the itinerary begins processing, an active state for the first step may be logged to the BAM database 66. As the processing of the first step is completed, a completed state for the first step may be logged to the BAM database 66. In various implementations, logging by the BAM server 8 may take place for one, all, or any of these various statuses as directed by the itinerary. For example, the itinerary may specify for one, all, or any of the one or more steps in the itinerary that the active and completed state be logged, or just the completed state. A wide variety of step-wise status logging for itinerary processes are possible using the principles disclosed herein.

In implementations of the methods 70, 94, if an error or fault is encountered or thrown during processing of the itinerary, an error state for the itinerary may be logged to the BAM database 66 by the BAM server 8. As illustrated in FIG. 12, an exception management framework is utilized to write or log errors to the exception database 68. This exception management framework is also utilized to log errors to the BAM database 68. In logging, a wide variety of data regarding the error and the data of the message that existed at the time the error occurred may be logged to the BAM database (include the entire data of the message, including the data payload and context properties). In particular implementations, an error state may be logged for the first step (and any other or subsequent step) in the itinerary if encountered or thrown on that step. As with the logging of an error for the itinerary, this logging of the error state to the BAM database may include logging a wide variety of data regarding the error and the message data in existence at the time the error was thrown to the BAM database (including the data payload and context properties). Referring to FIG. 11A, because the itinerary database 58 contains a list of all of the steps in the itinerary (through writing a row to the itinerary database for each step), the exception database 68, through use of the LogItineraryToFault trigger illustrated, can populate the tables in the exception database dbo.ItineraryToFault, which link the error thrown for a particular message to the particular step in the itinerary at which the error was thrown. In conventional ESB business activity monitoring systems, no linking between an error thrown for a particular message and the step in the itinerary at which the error was thrown occurs. Because of this, it is very difficult to determine what error logged in the exception database 68 matches up with a particular message and/or at what step in the itinerary the error occurred. This can make it very difficult to troubleshoot and resolve problems with the message, itinerary, or system 50 that is causing the error because attempting to link the error with a particular step in the itinerary can require laborious, time-intensive, and specialized knowledge and experience to perform.

In various implementations of the methods 70, 94, logging of data to the BAM database 66 may occur during a second step of the itinerary. As with the first step of the itinerary, one or more resolvers may be associated with the second step which identifies the data to be logged to the BAM database 66. This same process may be followed for each additional step in the itinerary where data logging to BAM is desired. Also, for the second step, logging of pending, active, and completed status for the second step may also be done using the BAM server 6. Error status and data relating to the error may also be logged for the second step just as has been described herein for the first step. Additionally, logging of data in the second step may involve logging data identified in a continuation included in one or more of the resolvers included in the first step of the itinerary. As will be discussed in more detail hereafter, data to be logged may not be available during processing of the first step of the itinerary. For example, a message that consists of a purchase order may include the first and last name of the individual ordering. During the course of processing the message, the itinerary designer wishes to have an email sent to the sales representative who has the account for the person who ordered. During processing of the first step, a resolver indicating that the first and last name of the person order should be logged is included, and this information is taken down. This resolver contains a continuation, indicating to the system that additional data needs to be logged to the BAM database. During processing of the second step, where the email address of the sales representative handling the account for the person whose first and last name was just logged is added to the message data, because the continuation was set in the resolver in the first step, the system 50 can log the email of the sales person to the BAM database 66. The continuation tells the system to continue to be ready to log data to the BAM database 66 during any subsequent step in the itinerary (second, third, fourth, etc.).

In various implementations of the methods 94, logging of data to the BAM database during processing of the first and any subsequent step in the itinerary may occur through use of an orchestration and/or during execution of an orchestration during an itinerary step. The logging of the various statuses (pending, active, or complete) may also occur by calling the orchestration and/or as part of executing a particular orchestration.

During design time, a designer using the design computer 14 creates an itinerary to be used to handle specific messages and/or message types. The resulting itineraries are saved into the itinerary database 58 using the itinerary server 6. An implementation of a method of creating an itinerary includes creating a logging service extension and selecting a logging service extender. The logging service extender is configured to log the data desired in to BAM and may be a logging messaging extender or a logging orchestration extender. At this point the designer enters the information that is desired to be logged into BAM, such as the first and last name identified in the message. The designer can also set the continuation property to true, indicating that there is additional information to be logged after this particular step in the itinerary. The designer can also select a logging resolver which handles logging the particular item from the message that is desired (such as the first name). The designer sets various properties for the resolver, which may include data type, extractor type, and friendly name (the name that is used as the column heading in the various computer interfaces disclosed herein). In various implementations of the system, new extractor and extension types may be used that are different from those conventionally available for resolvers that implement the desired logging behavior. In particular implementations, the data type of the logging resolver needs to be set so that the system knows what to expect the data to be logged to be. It can take the form of any data type handled by the system 50, including DATETIME, FLOAT, INT, and NVARCHAR with any desired length.

The designer then selects the particular data extractor type to be used to process the message and extract the desired data to be logged to the BAM database 66. In particular implementations, the data extractor may be a business rule engine extractor, which processes the message by firing or executing a rule in the business rules composer of the business rule engine of the system 50 to log data based on the policy stored on the business rule engine. The designer can select the desired deployed policy in the business rule engine that should be applied, including the version of the policy (if a specification is deleted, the system will use the greatest policy deployed). The use of the business rule engine extractor permits logging of data that flows through the ESB. Where the data flows are the same and the source data is different, based on use of the rules executed or fired in the business rule engine it is possible to log the same data found in different locations in the flow based on the message structure. Logging of message payload data is possible using Xpath functions as well as logging of message context properties. Any other logging possible using business rules is also possible, including of data external to the message itself (for example, the name of the particular message box server processing the message).

The data extractor may also be a context extractor that logs one or more of the one or more context properties associated with the message. When the designer selects this extractor type in the itinerary flow designer, the system queries the management database included in the system to list all of the deployed context properties available. When a particular property is selected, the system may automatically fill in the different types of information used depending on whether the messaging pattern is messaging-based (name and TargetNameSpace, for example) or orchestration-based (FullName, for example).

The extractor may also be an Xpath extractor that processes the XML data in the message or passing through the ESB and logs a particular data item to the BAM database 66. This extractor type is a static version used to extract data from a message which interrogates the data payload and logs the information desired using an Xpath function (sum, count, substring, etc.) supported by the system 50.

When the itinerary is ready to be exported, two different itinerary model exporters may be used to create the business activity monitoring definitions during exporting of the itinerary. A database itinerary exporter with business activity monitoring (BAM) may be used as may an XML itinerary exporter with BAM. For the database itinerary exporter with BAM, the exporter deploys the BAM activity directly to the BAM primary import database of the BAM database 66. When the itinerary is loaded into a code editor such as VISUAL STUDIO, the tracking database exporter dynamically determines what the default database is for the BAM database. If another database is desired, a SQL server connection string to another database may be manually selected. An activity overwrite Boolean flag may be included during the export. If the flag is set to true, the activity will be re-added if it already exists. If the flag is set to false, the system will indicate in VISUAL STUDIO that the activity cannot be deployed because it already exists.

Where the itinerary model exporter is an XML itinerary exporter with BAM, a BAM activity XML file property is used to specify where the BAM activity definition will be created, which is in a default folder that is created if it does not exist, but can be changed to any folder or name if desired. When the itinerary is exported using the XML itinerary exporter, both the itinerary XML file and BAM activity XML file are shown in VISUAL STUDIO.

In various implementations of the system 50, when a new itinerary is being created, the conventional default setting in the system that requires use of an encryption certificate may be set to false. Changing this setting from true to false may permit the itinerary logging to take place without the creation of errors or run-time dialog boxes that would prevent the itinerary from processing as desired.

The foregoing discussion details the system components and method implementations that are used to create the data in the BAM database 66 that is supplied by the BAM server 8, cached using the caching server 12, and made available to the user computer 16 by the web server 10 via telecommunication channel to create the computer interfaces 18, 30, 46 disclosed in FIGS. 1-5. The computer interfaces 18, 30, 46 enable the user to view in real time (or substantially real-time, depending on the amount of data involved and the capabilities of the caching server 12 and telecommunication network) the status of itinerary processes running on the system 50 (through the data logged in the BAM database 66). Furthermore, the computer interfaces 18, 30, and 46 permit the user to resubmit itinerary processes in error states to the system 50 for reprocessing. In particular implementations, the interfaces 18, 30, and 46 permit resubmission of the itinerary process for reprocessing at the step in the itinerary at which the failure occurred. Conventional ESB business activity monitoring systems (such as the BIZTALK Server 2010 and BIZTALK ESB TOOLKIT version 2.1) only permit resubmission of itinerary processes at the beginning of the itinerary. This behavior can create significant issues depending upon the nature of the transaction involved. For example, if the itinerary involves processing a credit card for a customer and an error occurs in a step of the itinerary following the successful charging of the customer's card, if the itinerary is resubmitted conventionally, the customer's credit card will get charged again for the same amount specified as the step(s) in the itinerary that involve charging the card will be re-executed. In contrast, implementations of ESB business activity monitoring systems and methods of monitoring business activity disclosed herein permit the user to resubmit the itinerary for processing at the step where an error occurred (error step). In the above example, this capability would prevent the customer's credit card from being charged a second time.

Referring to FIG. 4, a resubmit button 120 is illustrated shown in dashed lines to represent being greyed out or unavailable. The table 44 contains a check box 122 for each row corresponding with each itinerary process having an error status. A check box in the header row can be selected which checks all of the check boxes for each itinerary process in the table at once and queues all the itinerary processes for resubmission. When at least one of the check boxes is checked by the user, the resubmit button 120 changes form to become available or ungreyed out and configured to be activated by the user to resubmit the selected itinerary for processing at the error step in the itinerary, the friendly name of each error step being listed for the itinerary process in the ServiceBusinessName column of the table.

Resubmission using the resubmit button 120 only permits the user to attempt reprocessing of the message at the itinerary step where the error occurred, but does not allow the user to make any changes to the data in the message to correct any errors or see the data in the message. The resubmit button 120 may be useful in situations where processes need to be resubmitted to handle a hardware or other system component failure which have caused errors in the itinerary steps, where there is not a data-specific problem. Determining whether a system problem is involved or a data problem can be difficult, particularly for conventional systems, as in convention systems, the errors stored in the exception database 68 are not tied or associated to steps in a particular itinerary in the BAM database 66. Any conventional itinerary processes showing an error state must be researched extensively in the exception database and the rest of the system 50 when conventional tools like the ESB Management Console illustrated in FIG. 12 are being used. In contrast, all of the information needed to assess whether the error is a system or data error is immediately available to the user using the ESB Dashboard component illustrated in FIG. 12, of which the computer interfaces 18, 30, and 46 are portions of. The following discussion illustrates the information available to the user in the computer interface 46.

Figure 6:
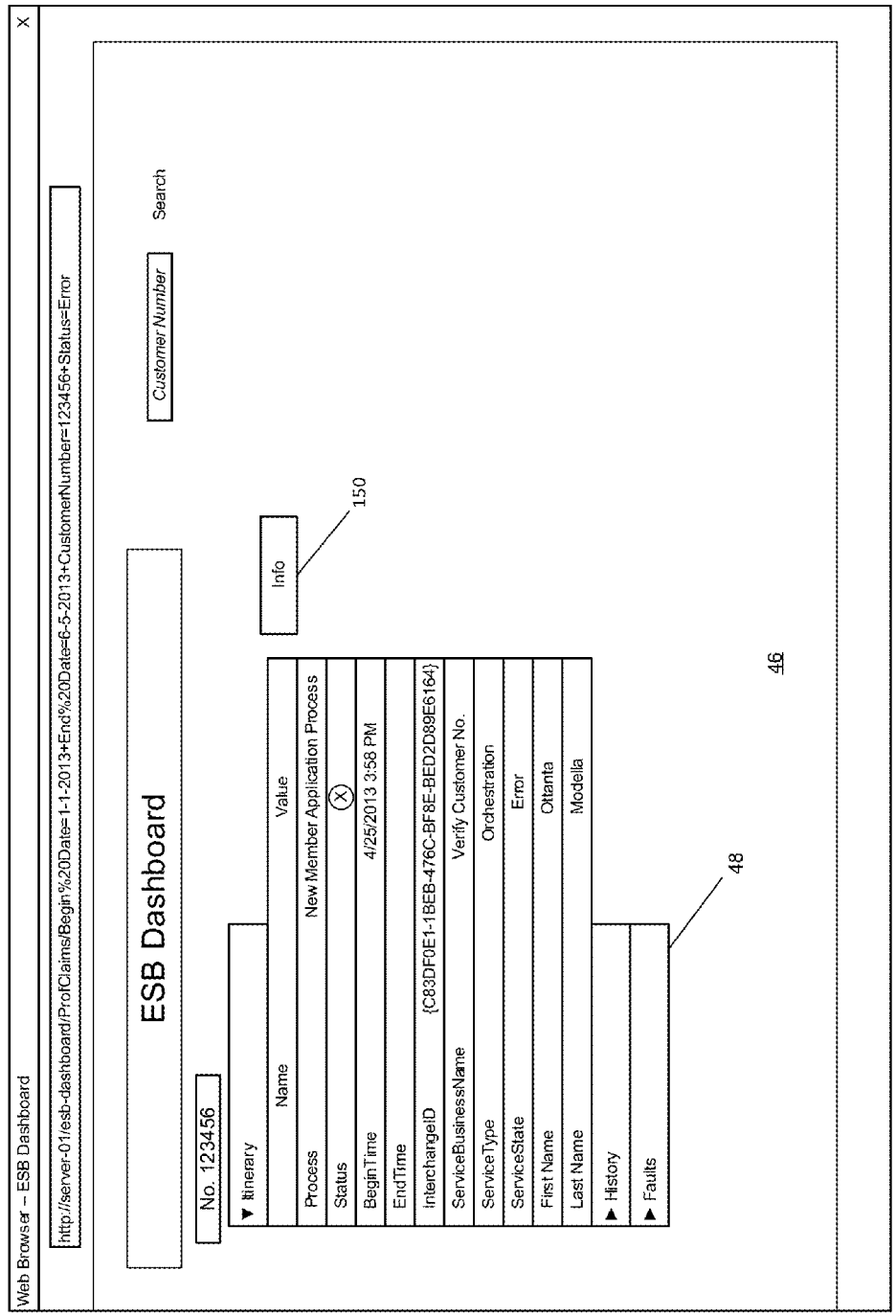
FIG. 6 is a diagram of the computer interface implementation of FIG. 5 with the itinerary section expanded.

Referring to FIG. 6, the accordion-style web form 48 is shown with the itinerary section expanded. As was discussed previously, this computer interface 46 is created by the user computer 16 in response to the user selecting the hyperlink associated with a particular itinerary process having an error state in the interface 30 illustrated in FIG. 4. As illustrated, the information in this view shows a table (itinerary table) 124 that includes the friendly name of the itinerary, its current status, the time it began, the interchange id associated with the itinerary, the service business name at which the itinerary ceased processing and the service type involved at that step (orchestration here). The table 124 also includes the data values logged to BAM through the resolvers at this point (first name and last name). Adjacent to the table 48 is an informational button 150. The informational button 150 permits the user, after reviewing the information in the web form 48, through selection of the informational button 150, to identify the particular itinerary process as informational by setting the informational status in the BAM database for that process. Being able to set a process as informational may have the advantage that it allows the user to clear out a message with bad data in it and process a new replacement message in its place sent by the external source or provider and prevent reprocessing of the message with bad data. Also, being able to set a process as informational may allow the user to clear out itineraries attempting to process messages that resulted in errors because the messages have bad or missing data and which cannot be repaired for reprocessing because the missing or bad data cannot be corrected (as when a potential customer fills out a request form, but fails to provide needed information and never returns to the company to provide the information). Processes with informational status appear in the list of processes that are active, pending, etc.

Figure 7:
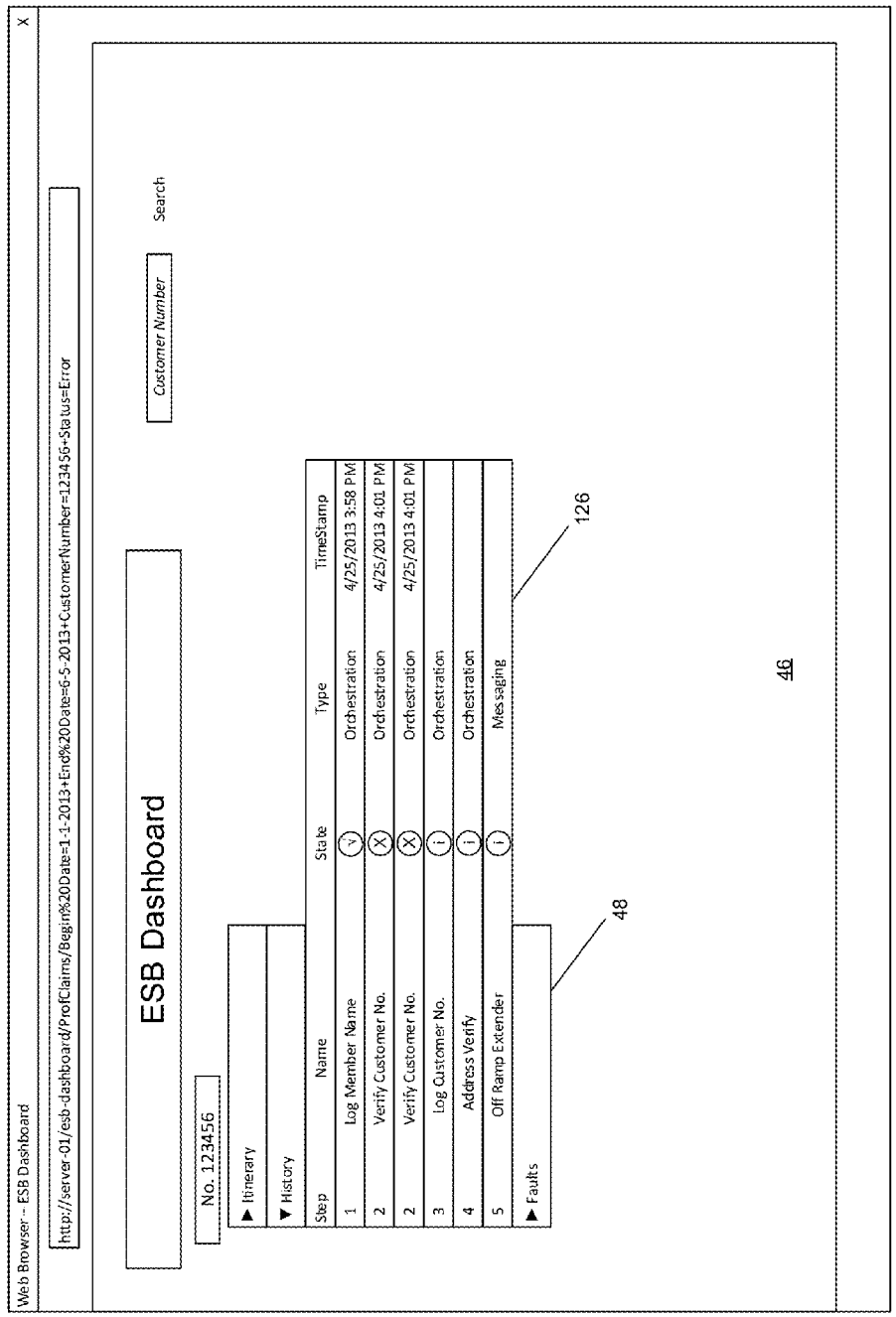
FIG. 7 is a diagram of the computer interface implementation of FIG. 5 with the history section expanded.

Referring to FIG. 7, the web form 48 is illustrated with the history section expanded, showing a table (history table) 126. As illustrated, the history table 126 shows the data from the BAM database 66 that shows the list of steps in the itinerary by friendly name and the current status of each step. In the example, the first step has been successfully completed as indicated by the completed status indicator with the check mark. The second step, however, has an error indicator indicating that the process of verifying the customer number has not been successful. This step appears in the table twice, indicating that the system 50 either retried the step automatically or that a user resubmitted the itinerary for processing again following an error at this step and the step again failed to complete successfully. The remaining steps in the table have a not invoked indicator (an icon with a lower case i in the circle) in their row, indicating that the steps have not yet been attempted. The history table 126 allows the user to quickly determine at what step in the itinerary the failure has occurred and how many retries have been attempted already.

Figure 8:
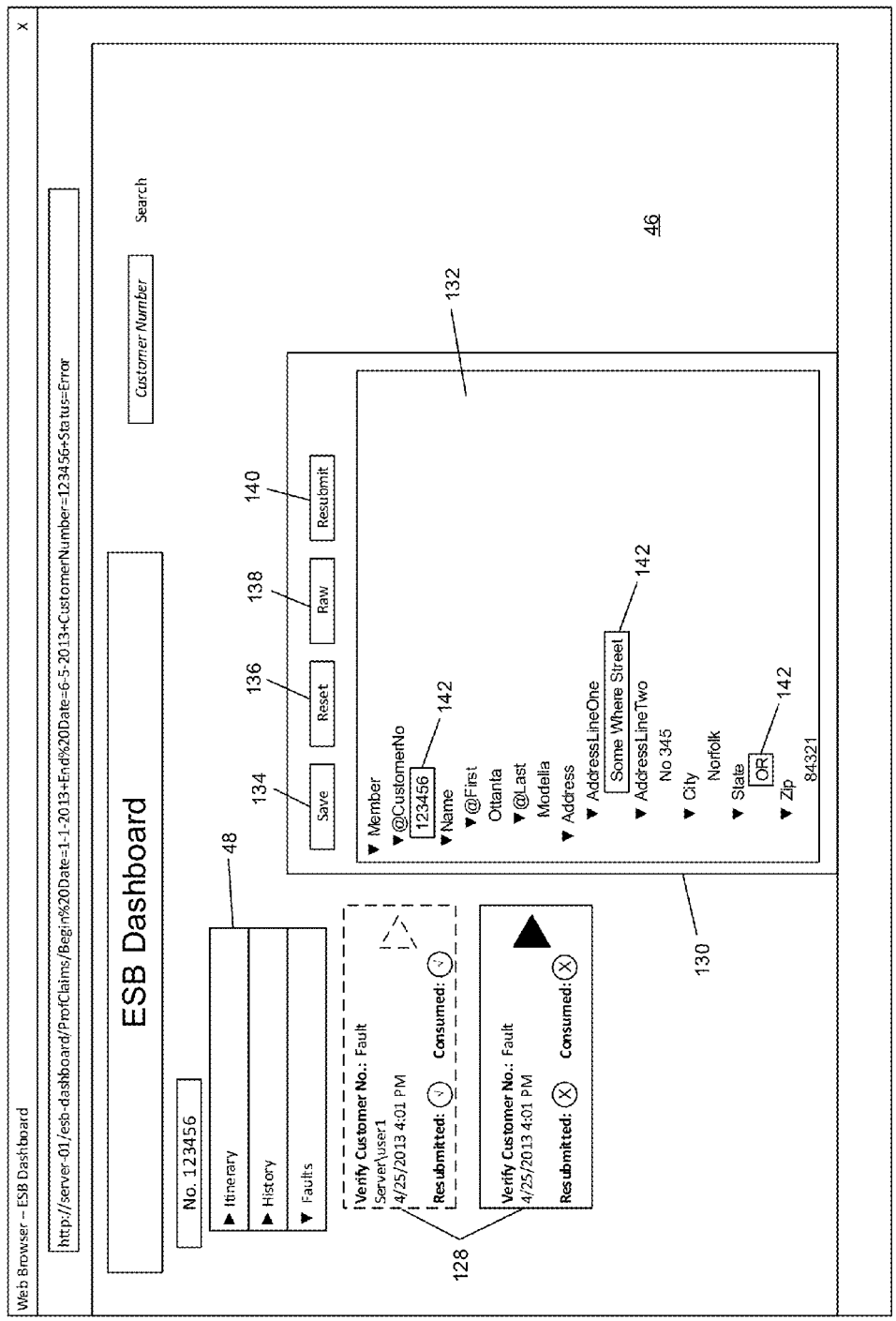
FIG. 8 is a diagram of the computer interface implementation of FIG. 5 with the faults section expanded, showing the data editor containing data associated with the lowermost fault message.

Referring to FIG. 8, the web form 48 of the computer interface 46 is shown with the faults section expanded, illustrating a fault table 128. The fault table 128 has two entries, each corresponding to the two faults in the history table 126 illustrated in FIG. 7. The upper entry is in dashed lines indicating it is greyed out indicating it is not currently selected by a user. The lower entry is in solid lines indicating it has been selected by the user and is in focus. The upper indicator contains indicators that show that the itinerary has been resubmitted at this step already and consumed by the system. The upper indicator also shows the user name of the user who performed the resubmission of the itinerary. Adjacent to the lower entry is a data editor 130 that is generated by the user computer 16 and web server 10 in response to the user selecting the lower entry in the fault table 128. As illustrated, the data edit has a data view window 132 in which data logged from the message at the step in the itinerary in the BAM database 66 is displayed. The data editor 130 also contains a save data changes button 134, a reset data changes button 136, a view raw data button 138, and a data resubmit button 140. The data view window 132 shows the structure of the data and places the data values themselves in editable fields. The structure of the data itself is not editable in the initial view in the data view window 132, however, the data structure field names, positions, etc. can be edited if the user presses the raw data button 138. As the user edits the data in particular fields, the edited fields are highlighted (indicated by highlight boxes 142). If the user wishes to reset all of the edited fields back to the original data values, the user can press the reset data changes button 136 and the original data values are restored. When the user is ready to save the changed data values to the message data payload and/or context properties, the user can select the save data changes button 134. Once saved, the user can resubmit the message for processing by the system 50 at the step in the itinerary at which the fault occurred by pressing the data resubmit button 140. Processing of the itinerary process resumes using the newly saved data.

Figure 9:
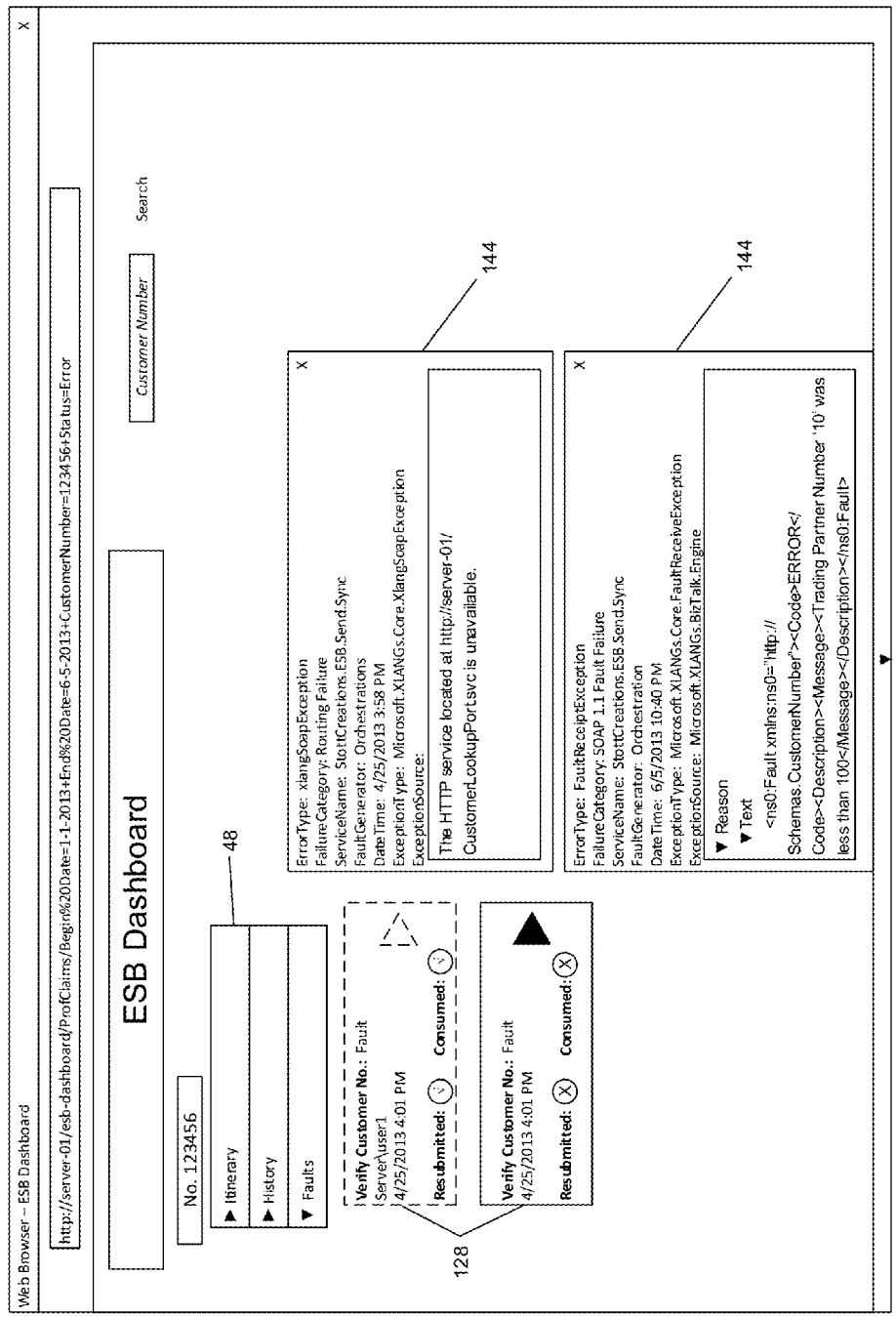
FIG. 9 is a diagram of the computer interface implementation of FIG. 5 with the faults section expanded, showing two fault view windows.

Referring to FIG. 9, the web form 48 is again shown with the faults section expanded showing the fault table 128. As in FIG. 8, the lower fault message is selected causing two exemplary fault view windows 144 to display. The fault view windows 144 may display upon selection of the error type in a particular way, either through the user double clicking the fault message or through selecting a particular part of the message, which may be hyperlinked to cause the message to display. The upper fault view window 144 contains is an example of an error message containing error log data linked to this step of the itinerary in the BAM database 66 that demonstrates that the reason for the error is a system service is not available. The lower fault view window 144 contains an example on an error message that contains error log data that indicates that the reason for the fault is that the data has a formatting or value problem. The user can utilize this information in determining whether to use the data editor 130 to change data values or whether to simply resubmit the process once the system issue is corrected.

Figure 10:
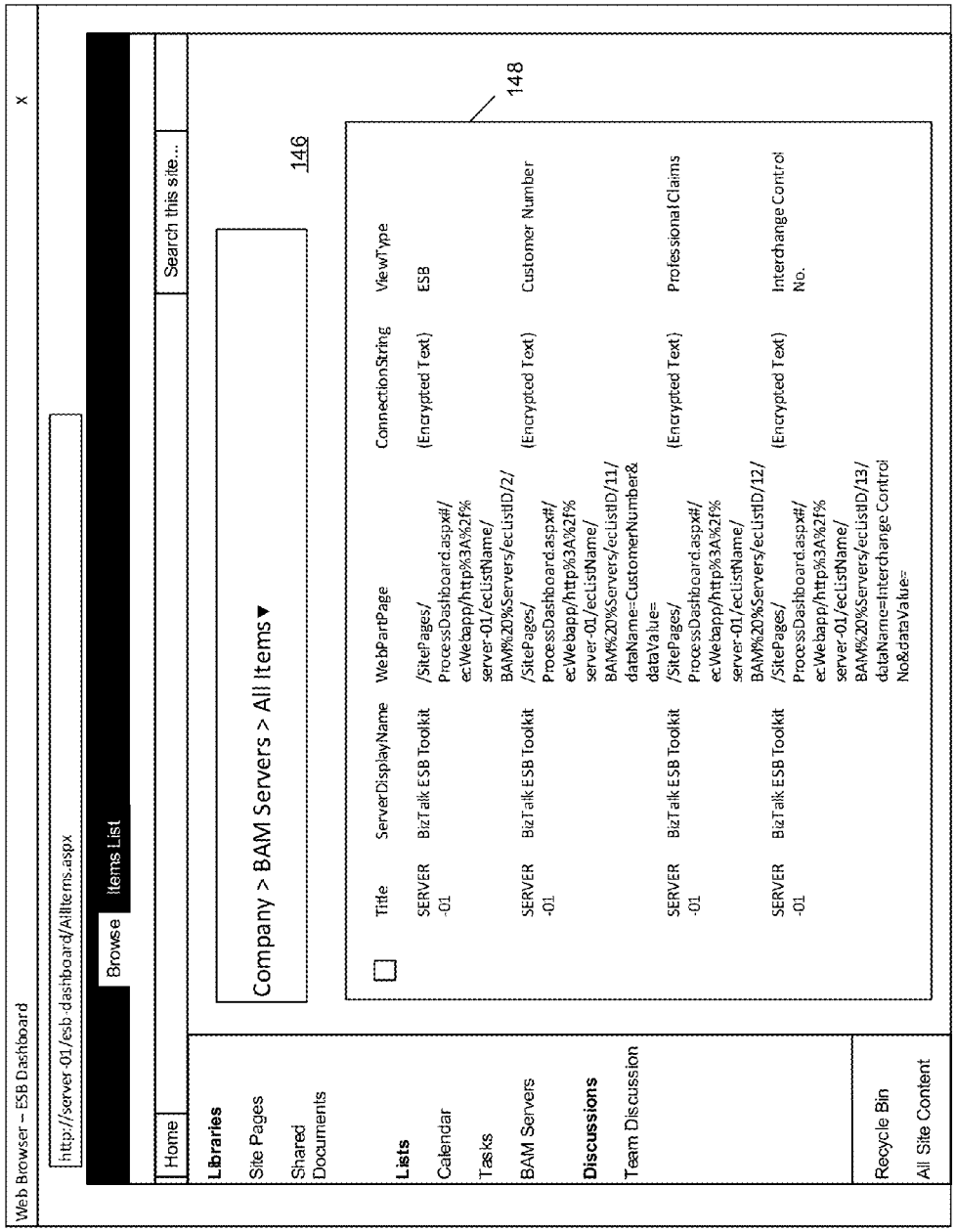
FIG. 10 is a diagram of another computer interface implementation illustrating a plurality of business activity monitoring (BAM) servers associated with the system.

Referring to FIG. 10, a computer interface 146 is illustrated that is created when the user selects the BAM Servers link on the left of the computer interface 18 illustrated in FIG. 1. This view shows the various web part pages corresponding with each BAM server in the system that could be used to operate with the ESB business activity monitoring system. Each of the entries in the table 148 corresponds with the different forms 22, 24, 26, 28 shown in the web form 20 in FIG. 2 and establishes the connection the computer interface in FIG. 2 makes with the BAM server 8 and/or caching server 12 and/or web server 10 to generate the computer interfaces in the system.

Figure 16:
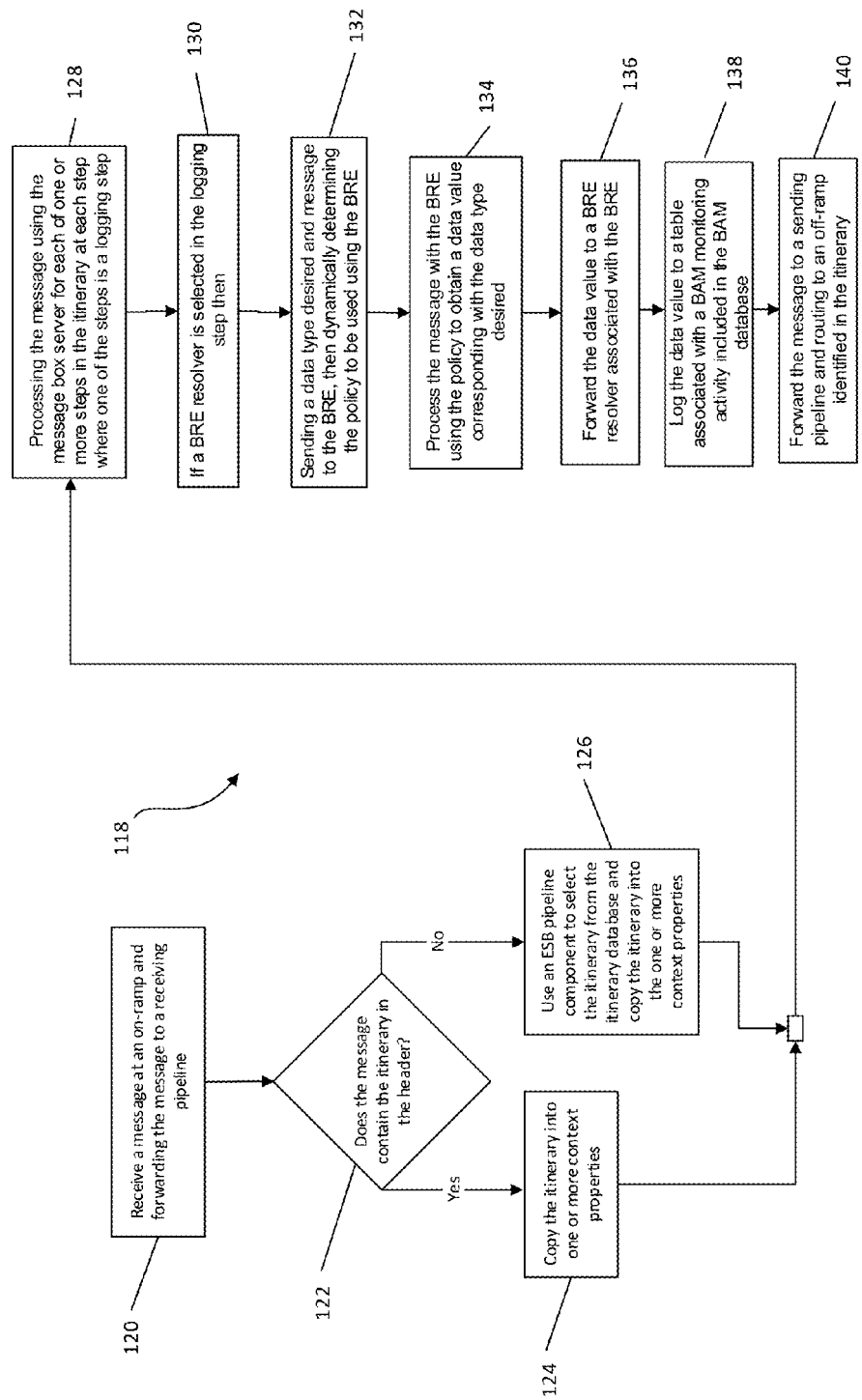
FIG. 16 is a flow chart of an implementation of a method of logging data.

Referring to FIG. 16, an implementation of a method of logging data 118 is illustrated. As illustrated, like the message processing methods described herein, the method 118 includes receiving a message at an on-ramp and forwarding the message to a receiving pipeline (step 120). If the message contains an itinerary in the header, as determined in step 122, then the method includes copying the itinerary into one or more context properties (step 124). If not, then the method includes using an ESB pipeline component to select the itinerary from the itinerary database and copying the itinerary into the one or more context properties associated with the message (step 126). Implementations of the method 118 may be employed with any of the other method implementations of executing, processing, and logging data associated with the processing of one or more steps in an itinerary disclosed in this document. Accordingly, implementations of the method 118 may include logging a pending state after copying the itinerary into the one or more context properties (and any of the other logging steps disclosed herein). In other implementations, the state logging of the processing of the itinerary steps may be not included. The method 118 also includes processing the message using the message box server for each of one or more steps in the itinerary at each step where one of the steps is a logging step (step 128). If a Business Rule Engine (BRE) resolver is selected to be executed during the logging itinerary step (step 130), then the method includes sending a data type desired, and all or a part of the message to the BRE for processing (step 132). The method also includes dynamically determining the policy to be used to process the message using the BRE itself (step 132). The method also includes processing the message with the BRE using the policy to obtain a data value that corresponds with the data type desired (step 134).

A policy contains information about where particular data values reside in a message of a particular format, or about how the data is structured and stored within the message. For example, the policy would provide information about where in the data payload or context properties of a particular message a patient first name or an invoice number could be located. In this example, the data type corresponds to an indication that the patient first name is the type of data that is desired from the message. The first name, once it has been obtained from the message, becomes a specific data value from a specific message. The process of using the BRE to execute a policy to obtain a data value corresponding to a data type set up for retrieval in the itinerary step may be referred to as interrogating the message using the BRE to obtain the data value (i.e., first name or invoice number). Since the BRE is used, the message box server through the BRE can also dynamically, or automatically, determine what policy should be used to process the message to obtain the particular data type desired.

Once the particular data value has been obtained by interrogating the message with the BRE, the data value is forwarded to a BRE resolver associated with the BRE (step 136) and logging the data value to a table associated with a particular BAM monitoring activity (step 138). The table is included in the BAM database coupled to the messaging server, which is involved in executing the BRE and other steps. After the itinerary logging step has been completed, the message is forwarded to a sending pipeline and routing to an off-ramp identified in the itinerary (step 140). The data value in the table in the BAM database can now be used for any of a wide variety of purposes, including later message processing, subsequent message processing, error logging, statistical tracking, performance tracking, and any other processing function needed by the messaging engine and systems disclosed herein.

Figure 17:
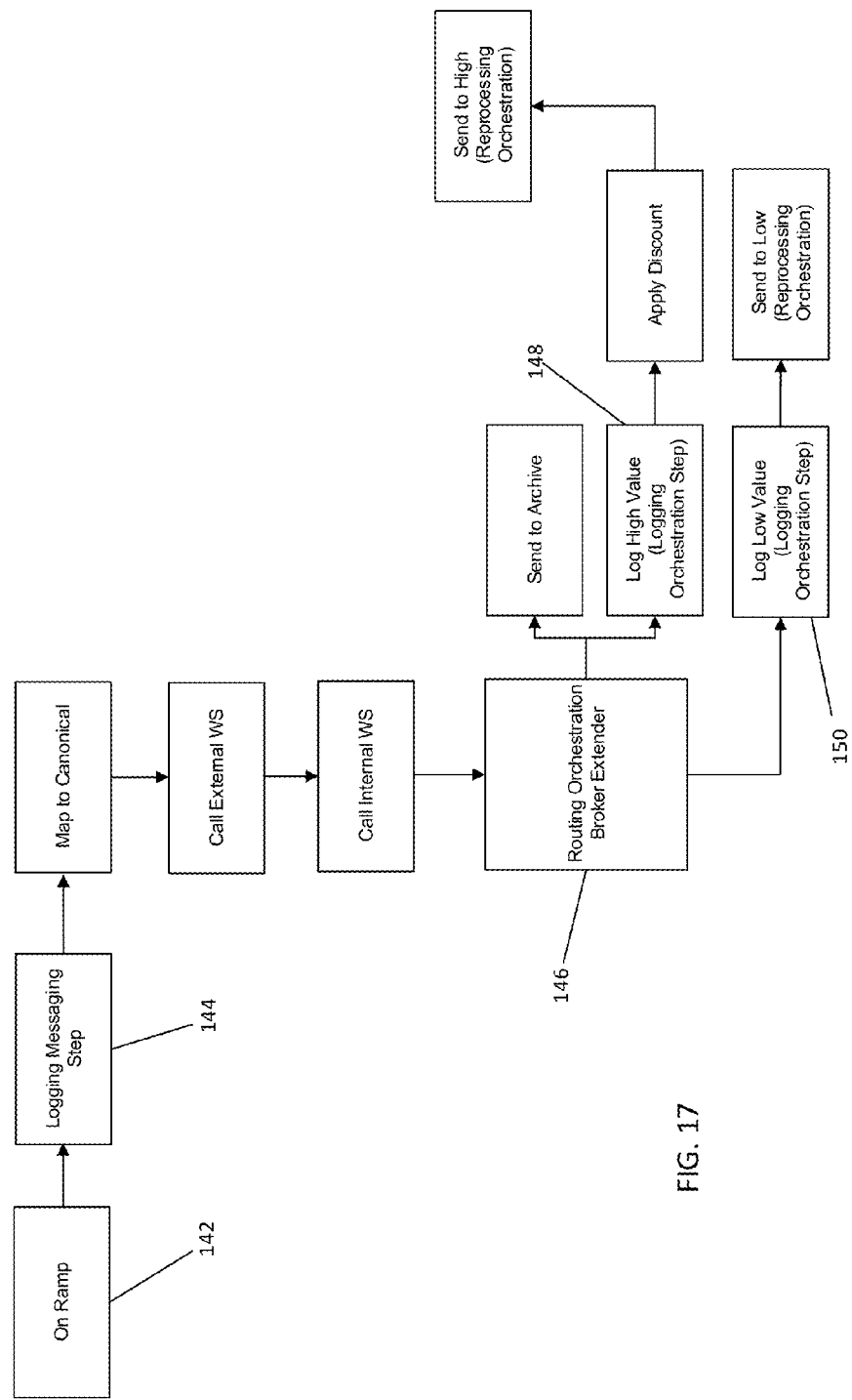
FIG. 17 is a block diagram of an itinerary implementation in an itinerary flow designer.

Itinerary logging steps may be employed where message processing using the itinerary by the message box server is done using messaging processing (i.e., in the pipeline) and also where the message processing is done using an orchestration. The advantage of being to add logging steps to the itinerary itself is that it allows for the direct interrogation of the messages to obtain needed/desired data values from specific messages during execution of an itinerary rather than at the end and can be used during subsequent steps in the itinerary (or other itineraries or subsequent messaging processing steps). All the data of the message is now available for pulling as desired using an itinerary logging step. Referring to FIG. 17, the itinerary flow designer is illustrated showing the graphical elements that correspond to various steps in an itinerary. During construction of the itinerary, the itinerary flow designer is used by the user to build the itinerary by connecting various graphical itinerary processing steps. In the itinerary implementation illustrated in FIG. 17, an on ramp 142 element is included which handles initially receiving the message as disclosed herein. The next step in the itinerary is represented by graphical element logging messaging step 144 (logging itinerary step). This is an itinerary step that involves logging during processing of the message using messaging processing in a pipeline and does not require storage of the message in the message box database associated with the message box server.

Following carrying out of the logging requested through the options selected using the graphical element (to be discussed in detail for FIG. 18), various other itinerary processing steps continue to process the message. A routing orchestration broker extender 146 carries out decision making about the flow of the message through the later steps of the itinerary. In this case, the extender 146 can decide based on various criteria set up in the extender 146 to send the message to a logging orchestration step 148. The options for a logging orchestration step 148 are set up similarly to those for messaging comprehending the processing differences between pipeline processing and message box processing. In this case, the objective of the logging step 148 is the log the value for an invoice to enable the application of a discount in a subsequent itinerary step before being sent out for a reprocessing orchestration for the value being too high. If the routing orchestration broker extender 146 determines that the message should be sent to the log low value logging orchestrations step 150, then this logging itinerary step will be used to log the value of the invoice prior to being resent out to a low value reprocessing orchestration because the value is too low. As illustrated multiple types of logging itinerary steps and multiple logging itinerary steps may be included in a single itinerary flow using the itinerary flow designer.

Figure 18:
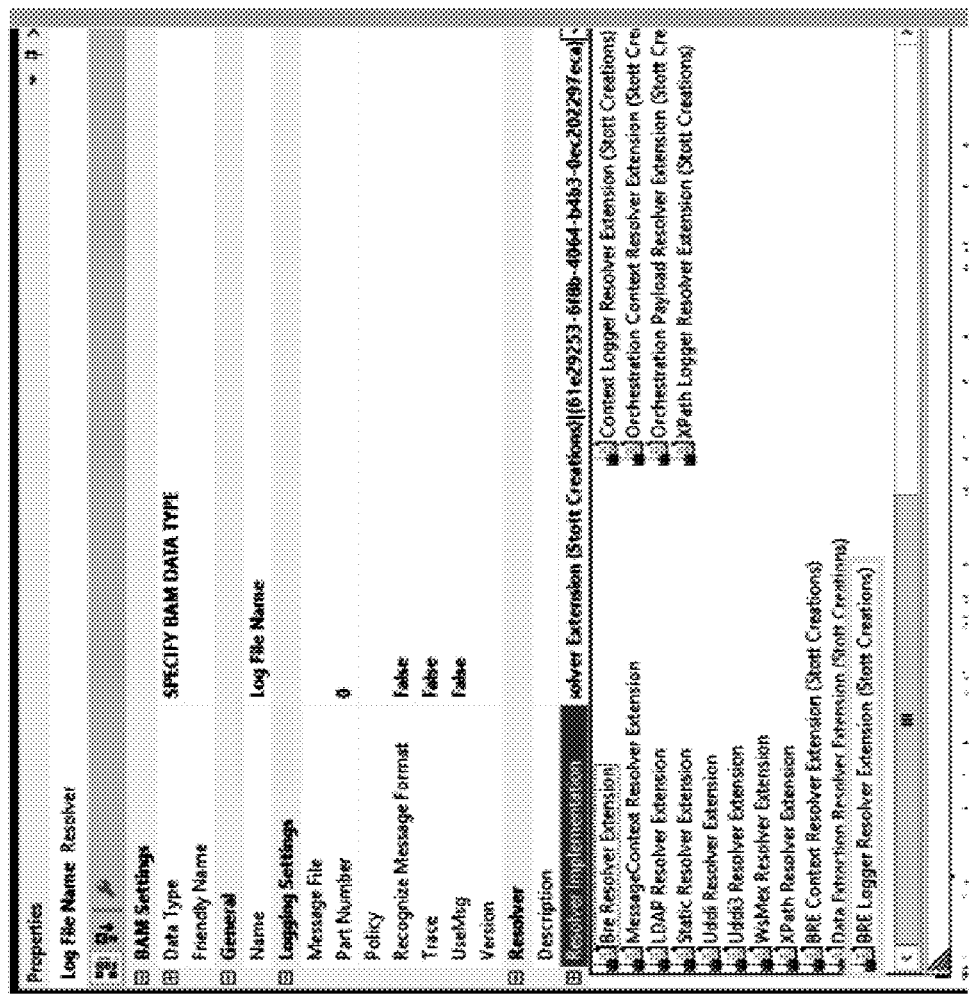
FIG. 18 is a chart of the properties of an itinerary logging step implementation.

Referring to FIG. 18, an implementation of the properties computer interface for an itinerary logging step is illustrated. As illustrated, the itinerary logging step includes specifying a data type to be retrieved from the message and may include a field for identifying a friendly more intuitive name for that data type. This data type is the kind of data value that the user wants to get from the message following processing (e.g., first name, invoice number, etc.). The logging settings fields in the properties interface for the logging itinerary step set up various processing parameters, including whether all, part, or some parts of the message are processed or set for processing by a resolver (Part Number) and what policy should be used during processing. In some implementations, the policy version to be used is explicitly entered in the policy field; in others, a general name for the policy is entered and the system uses the most recent revision of the policy during execution. Various options can be selected, including whether the format of the message will be explicitly determined during processing of the step or not (Recognize Message Format) and whether a trace file will be created in the BAM database to log the steps carried out during the itinerary logging step (Trace). Under the Resolver settings field, the specific resolver to be used to carry out the processing of the message is specified. A number of potential resolvers that can be used are illustrated.

As has been discussed in this document up to this point, the BRE Logger Resolver Extension is an example of a BRE resolver implementation that could be used in various implementations. Because the BRE is used to both identify and execute the processing of the policy specified in the logging itinerary step using the BRE resolver, there is no need to explicitly determine the format of the message or to perform conventional canonical message processing which involves looping through a series of conventional resolver types until the proper one is identified. Use of the BRE resolver permits dynamic determination of the policy to be used for the message on the fly and processing of the message to obtain the desired data value. There is no need during the set up of the itinerary logging step to have to specify a particular policy as the BRE resolver can perform this function during processing of the message.

As illustrated in FIG. 18, other resolver types can still be used, however. For example, xpath resolvers can be used for xml formatted messages to retrieve a specified data type from the message. However, because the xpath resolver is being used, it relies on specifying in the properties of the itinerary logging step what the policy (xpath policy) needs to be used to process the specific message type. Because of this the xpath resolver is less flexible, and is not message agnostic—the user must know the format of the message (i.e., xml) and the structure of the message (the policy) at design time to successfully use the xpath resolver. Similarly, a context resolver could be used to retrieve data types known to be in the context properties and not in the data payload of the message. An identical process would be used, where the context resolver processes the message using the specified message type and policy (context policy) outlined at design time in the properties of the logging itinerary step. Other kinds of resolvers can also be used, but, unlike the BRE resolver, they require the same knowledge of the policy to be used and message format/type to be determined at design time. The BRE resolver allows for flexible use of the itinerary logging steps to obtain a wide variety of data types from messages without requiring knowledge of the message type or policy—it is a fully message format agnostic way of interrogating the messages to obtain the data values desired for logging.

Figure 19:
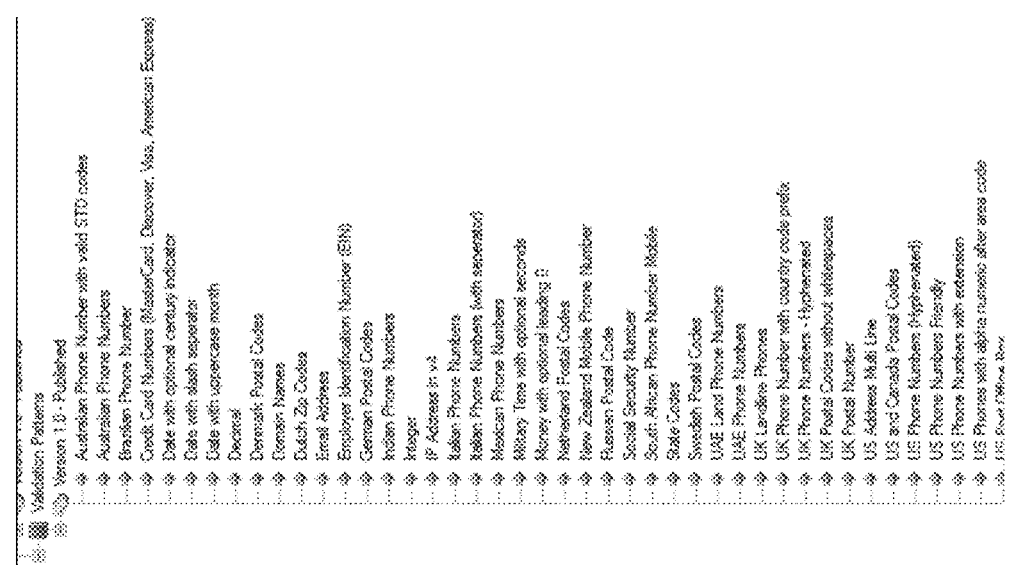

Various implementations of business rule engines (BREs) like those disclosed herein may utilize various policies for processing information in files and messages in itineraries orchestrations, and when carrying out various other system functions and processes. These policies include validation policies used to validate one or more data values that are contained in the files or messages. Referring to FIG. 19, a number of validation pattern implementations are illustrated that are included in a validation policy. These validation patterns include both regular expressions (Regex expressions designed for use by an internal data processing module) and human friendly (friendly) expressions (validation patterns that are easier for a person reviewing to determine what type of data is being checked). A wide variety of data values can have corresponding validation patterns, including any of the data value examples listed in FIG. 19 and others, including, by non-limiting example, telephone number formats, credit card number formats, time formats, date formats, Internet Protocol (IP) address formats, email address formats, social security number formats, employer identification number formats, postal code formats, and any combination thereof. Some validation patterns may be able to validate multiple data values simultaneously.

Figure 20:
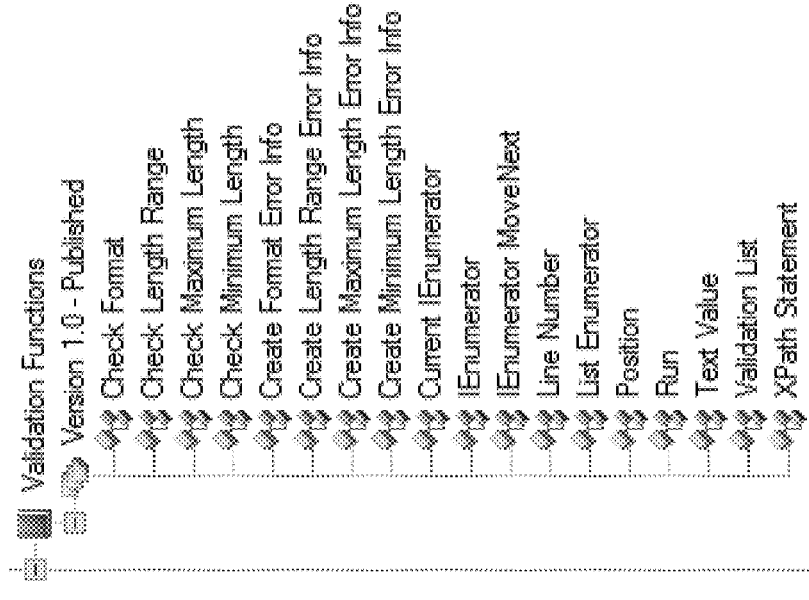
FIG. 20 is a portion of a list of validation function implementations.

Referring FIG. 20, validation policies also include various validation functions, which carry out validation operations with the data values from a message or file to help validate the data or load the data into variables for validation. For example the IEnumerator function acts as a container for the data to be validated and the Check Format function operates to apply a validation pattern to the data contained in a particular position in the IEnumerator container. In various implementations, the validation function may perform a validation check on the data without involving a validation pattern, or may act in combination with a validation pattern. Both the validation patterns and validation functions are included in a check format function and are used by the check format function in the validation policy to carry out the operations of validating the desired characteristics of the data value from the message or file.

The various functions disclosed herein may be carried out by a single server computer included in an application server, by multiple servers (i.e., in a "cloud" computing environment), carried out on a client computer, or client-side on a client computer coupled with a server or multiple servers in a cloud computing environment. Any of the application server systems disclosed in this document may be utilized in specific implementations. Also, both on-premise BREs and cloud-based BREs may be utilized in various system and method implementations disclosed herein.

Various system implementations may utilize implementations of a method of creating a validation policy. Various validation policies, as discussed previously may be used for particular document types only, or may be applied to multiple document/file types in various implementations. Method implementations include generating a validation policy, which in various implementations is a new policy that does not yet have any rules associated with it to be executed by the BRE. Following generating the validation policy, the method includes generating an assertion rule and including it in the validation policy to create a enumerator (which may be an IEnumerator in various implementations). Generating the assertion rule includes adding a first rule called 1 Assert (the 1 allows the rule to show up first in a list of rules associated with the validation policy) and setting a priority of the rule to 2, which is the highest priority number in this particular policy implementations. In various implementations, a Run vocabulary item is then added to an IF window (condition) associated with the rule, which has the effect of setting the Run value of the rule to True (telling the BRE to run this rule). In a THEN window (condition) associated with the rule, a List Enumerator is then selected/chosen to be asserted by the rule. The foregoing steps generate an assertion rule included in the validation policy that, when executed by the BRE, creates an enumerator.

Implementations of the method also include generating an advancing rule included in the validation policy that, when executed by the BRE, asserts the enumerator to the BRE as a fact. In a particular implementation, the advancing rule is generated by adding a second rule called 2 Advance to the validation policy and setting the priority of the rule 1 (the second highest number on this particular policy). In an IF window (condition) associated with the rule, an IEnumerator MoveNext vocabulary item is added to advance the enumerator (which is an IEnumerator in this implementation). In a THEN window (condition), Current IEnumerator is selected to be added to an assert action to assert the Current IEnumerator to the BRE as a fact when the advancing rule is executed. Also, in the THEN window, the IEnumerator is then selected to be added to an update action to update the IEnumerator (position within the IEnumerator, etc.) when the rule is executed.

Figure 21:
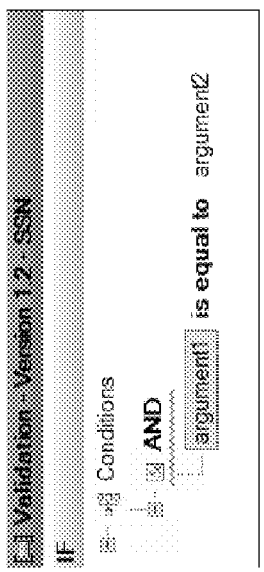
FIG. 21 is a computer interface implementation showing generation of a evaluation rule implementation at a first step.

In method implementations, one or more evaluation rules to be included in the validation policy are then generated. Each of the one or more evaluation rules includes a check format function and an error formatting function. In particular method implementations, the one or more evaluation rules are generated by creating a new evaluation rule and setting the rule with a default priority of 0 (the lowest priority in the validation policy) to enable each of the one or more evaluation rules to be executed in any order after the assertion rule and the advancing rule by the BRE. Referring to the computer interface illustrated in FIG. 21, a first part of the evaluation rule is generated by selecting in an IF window (condition) an AND condition, and choosing from a list of predicates, "is equal to." As indicated at the top of FIG. 21, the validation policy (and the rules) has to do with validating social security numbers (SSN). Referring to the computer interface illustrated in FIG. 22, argument1 has been replaced by an Xpath statement reference, which indicates that the type of data being looked for in a particular file or message is an Xpath reference to any particular node or portion of a file or message that is going to be validated by the rule. Referring to the computer interface illustrated in FIG. 23, argument 2 has been replaced by another Xpath statement query, which is the Xpath statement (Xpath) of the node/file portion the evaluation rule will be using for evaluation. This portion of the node/file can be a property of any element or attribute in the schema editor (for xml documents) inside a program like the visual coding development application marketed under the tradename VISUAL STUDIO by Microsoft Corporation. It may also be the location of any particular data value within a particular file type. Referring to FIG. 23, the first part of the evaluation rule has been constructed which first examines whether there is an Xpath statement in a particular message/file that corresponds with the Xpath statement query.

Figure 22:
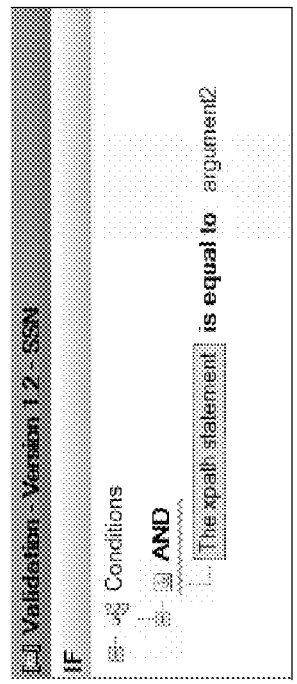
FIG. 22 is a computer interface implementation showing generation of a evaluation rule implementation at a second step.
Figure 23:
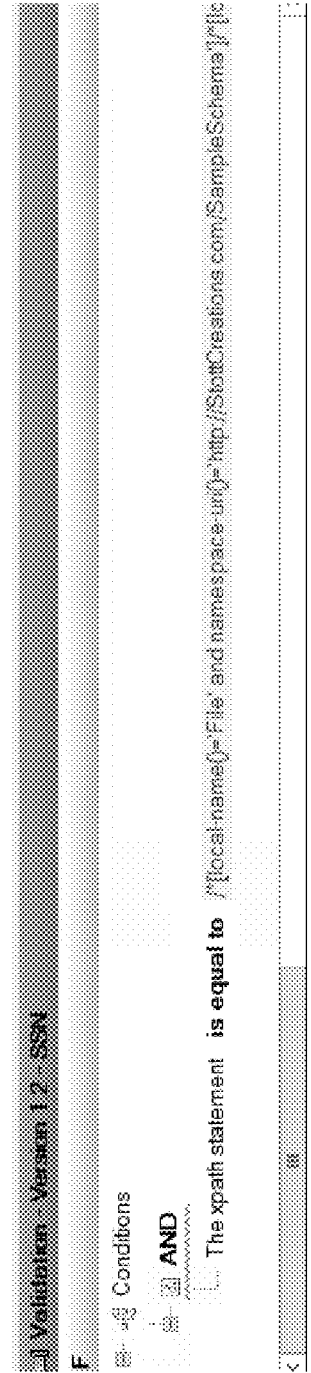
FIG. 23 is a computer interface implementation showing generation of a evaluation rule implementation at a third step.
Figure 24:
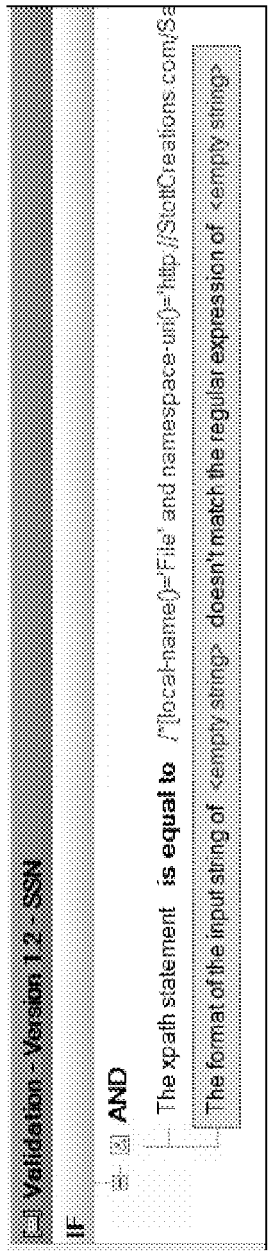
FIG. 24 is a computer interface implementation showing generation of a evaluation rule implementation at a fourth step.
Figure 25:
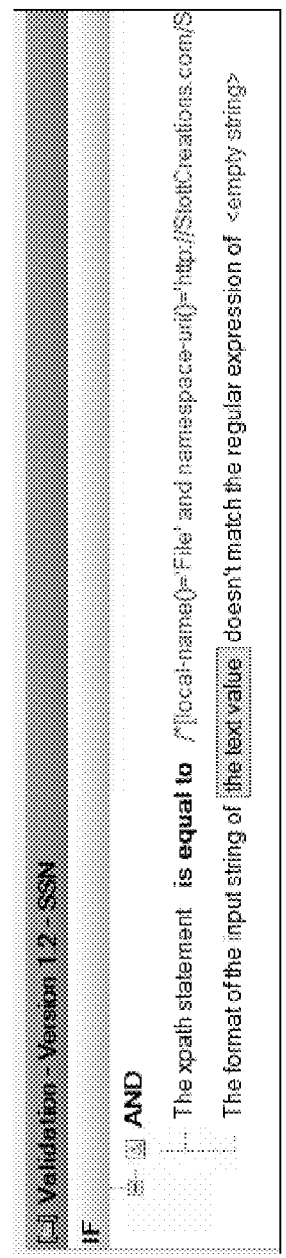
FIG. 25 is a computer interface implementation showing generation of a evaluation rule implementation at a fifth step.
Figure 26:
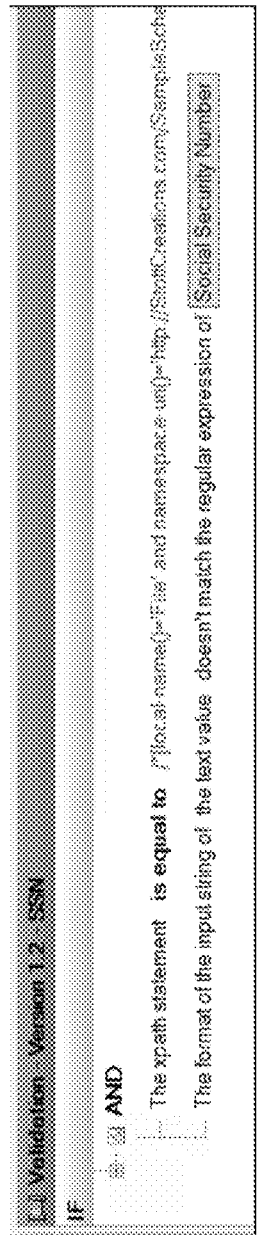
FIG. 26 is a computer interface implementation showing generation of a evaluation rule implementation at a sixth step.
Figure 27:
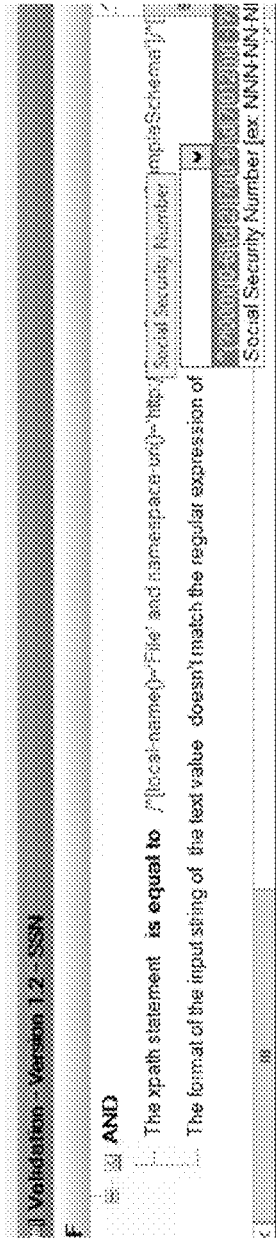
FIG. 27 is a computer interface implementation showing generation of a evaluation rule implementation at a seventh step.

Referring to FIG. 24, an implementation of a computer interface showing an implementation of a second part of the evaluation rule of FIGS. 21-23. As illustrated, the desired Check Vocabulary Item has been added to the AND portion of the rule. In this implementation, the particular vocabulary item that is to be checked is the Format of the Xpath statement returned by the Xpath statement query from the node/file being evaluated by the BRE. As can be observed, the format of one string will be compared to a regular expression (Regex or friendly). Provided that 1) the particular data value(s) exist in the particular file/node and 2) the format of the particular data values(s) fails to meet the format of the regular expression, then the subsequent step in the rule (the execution of an error formatting function) will take place. As illustrated in the computer interface illustrated in FIG. 25, the empty string field on the left has been replaced by a text value, indicating that for this rule, the data value(s) are text values. Referring to the computer interface in FIG. 26, the regular expression selected for use in comparing with the text value is that of a Social Security Number. Referring to FIG. 27, a drop down menu for Social Security Number regular expressions illustrated which shows the Regex form of the expression above the friendly form of the expression. Either form can be used with the BRE to perform the comparison. Once the second part of the evaluation rule has been generated to perform the vocabulary item checking, then an error formatting function included in the evaluation rule is generated.

Figure 28:
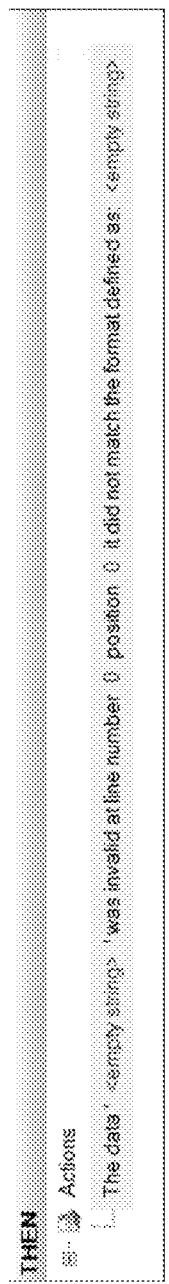
FIG. 28 is a computer interface implementation showing generation of a evaluation rule implementation at an eighth step.
Figure 29:
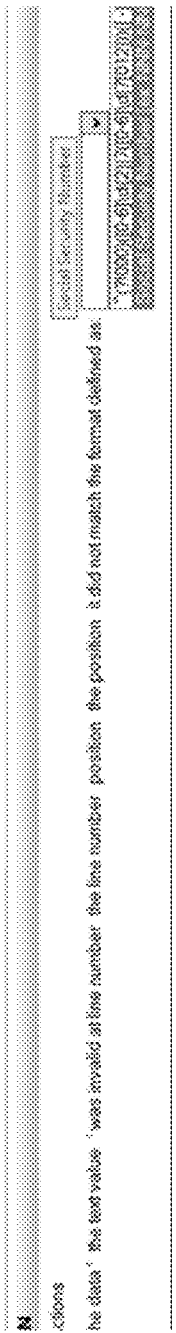
FIG. 29 is a computer interface implementation showing generation of a evaluation rule implementation at a ninth step.
Figure 30:
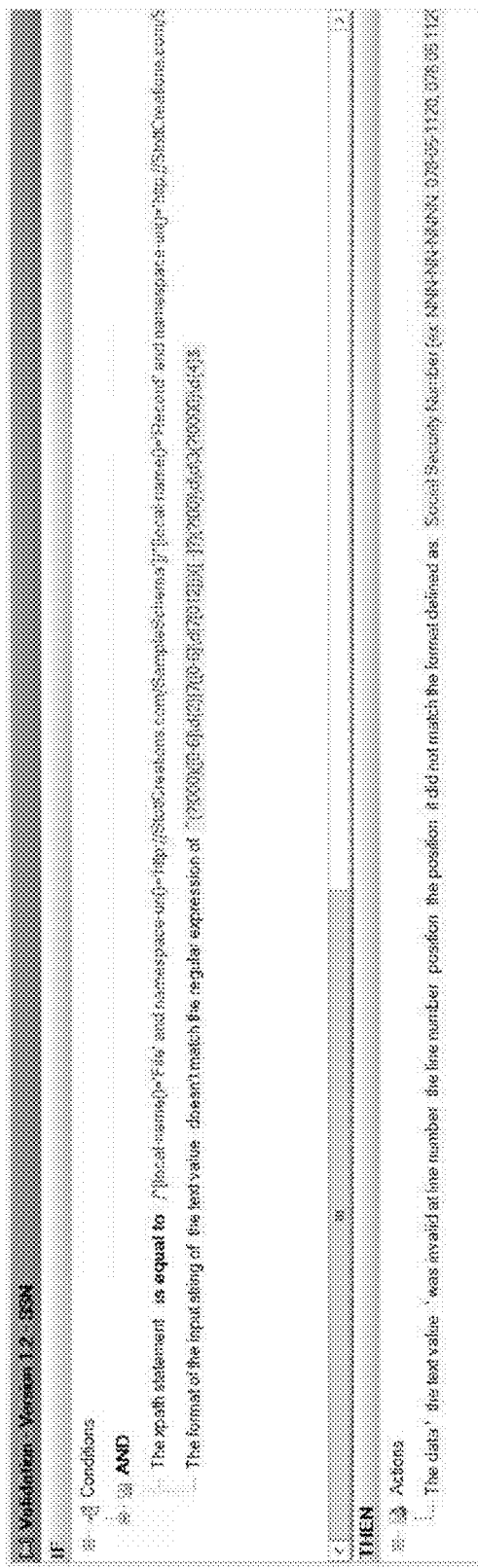
FIG. 30 is a computer interface implementation showing a generated validation policy showing an evaluation rule implementation including a check format function implementation and an error formatting function implementation.

Referring to the computer interface illustrated in FIG. 28, a THEN window (condition) for the evaluation rule is illustrated. As illustrated, a Create Format Error Info Vocabulary item has been added to the Actions section, which contains the basic structure of the error message which will be displayed to the user following the execution of the evaluation rule. In this implementation, the vocabulary item will return the value of a string being evaluated and point to a particular line number and position number in the string and return a description of the particular data format used for the evaluation. Referring to the computer interface of FIG. 29, the vocabulary item is shown with a Text Value vocabulary item replacing the first string field, a Line Number vocabulary item replacing the line number field, a Position vocabulary item replacing the position field, and a Pattern vocabulary item replacing the second string field. A drop down menu is show that includes the two regular expressions previously selected. Referring to the computer interface of FIG. 30, it can be seen in the THEN section that the regular expression selected for the error formatting function was the friendly form of the regular expression Social Security Number. FIG. 30 shows the entire evaluation rule implementation as it has been generated with the check format function under the IF section (condition) and the error formatting function under the THEN section (condition).

As discussed, in various method implementations, the check format function is configured to use an XPath statement to return one or more data values from the enumerator includes one or more validation patterns and a corresponding one or more validation functions configured to verify whether the one or more data values returned correspond with a pattern included in the one or more validation patterns and the one or more validation functions. The particular validation pattern(s) and validation function(s) used may be any disclosed in this document. Also as discussed, in various method implementations, the error formatting function is configured to, in response to one or more of one or more data values being evaluated failing to be verified (failing verification) by the check format function, generate an error message including the one or more of the one or more data values that failed to be verified and generate a computer interface to display the error message. The computer interface in various implementations may be a popup window on a screen associated with a user of the system, a formatted electronic message (email), a web page, a text message to a portable computing device or cellphone, or any combination of the aforementioned interfaces. A single or multiple interfaces/notifications may be generated in various implementations. As discussed, the one or more evaluation rules may include vocabulary items like Text Values, Line Numbers, Position, Pattern, etc. associated with the application server system. These vocabulary items may include the one or more validations patterns and the one or more validation functions themselves.

Using similar processes as outlined in the preceding paragraphs, validation policies can be created to check the length range of particular data value(s), check the maximum length, check the minimum length, or any other desired parameter or value of the data value(s). The appropriate vocabulary items can be inserted in the desired locations and the appropriate validation functions can be used to perform the needed evaluation.

Once the desired validation policies have been generated for use by the BRE using the various method implementations disclosed in this document, the validation policies may be used by the BRE to perform validation operations for messages and files being processed by the application server system. As previously discussed the operations may be performed using a BRE operating on a single server, a plurality of servers in a cloud system, a client computer, or both a client computer and a server computer coupled through a telecommunication channel such as the internet.

Implementations of application server systems like those disclosed in this document may implement implementations of methods of validating data in a message or file. The method may include receiving a message or a file from a computer associated with an application system (either through an itinerary or orchestration as discussed herein) and in response to receiving, calling a validation policy using a BRE included in a computer associated with the application server system. As the system calls the validation policy, the system executes the various rules associated with that policy, which may be determined by a priority each rule has been assigned within the validation policy as discussed previously. The method includes executing an assertion rule included in the validation policy on the message or the file to load one or more data values included in the message or file into an enumerator (which may be an IEnumerator as discussed herein). The method also includes executing an advancing rule included in the validation policy to assert the one or more data values included in the enumerator to the BRE as a fact (or one or more facts, depending on the implementation). The method also includes executing one or more evaluation rules included in the validation policy where each of the one or more evaluation rules includes a check format function and an error formatting function. This is accomplished by executing an XPath statement included in the check format function to return one or more data values from the enumerator, verifying whether the one or more data values returned correspond with a pattern associated with one or more of one or more validation patterns and one or more validation functions included in the check format function. These validation patters and validation functions may be any disclosed in this document. The method also includes in response to one or more data values failing to be validated by the check format function, generating an error message using the error formatting function where the error message includes the one or more data values that failed and an indication of which of the one or more validation patters that was failed and generating a computer interface to display the error message. The computer interface may be any disclosed in this document and may be displayed on any computing device disclosed herein or telecommunications device disclosed herein.

As was previously discussed, the one or more evaluation rules may include one or more vocabulary items, which may be me the various validation matters and various validation functions.

Referring to FIG. 31, a sample xml file is illustrated that contains various social security numbers (SSN) in various record tags that have various correct and incorrect formats. The validation policy outlined in FIGS. 21-30 was used by a BRE to evaluate the data values in the various SSN nodes using an enumerator as disclosed herein. In response to the evaluation process, the computer interface, an output window, was created which contained the error message, outlining which social security numbers had incorrect formats, where the error was found, and what the format should have been. Those of ordinary skill in the art will readily appreciate that the validation policy can be created as a class and can be referenced and called in an itinerary procedure and in an orchestration through incorporating an assembly and executing a script or stored procedure in the case of an itinerary or through inputting a script into an Expression Shape in an orchestration. The overloaded constructor in the Expression Shape will take an XLANGsMessage or XLANGsMessage or message part number. Following executing of the expression in the Expression Shape, the resulting record will have properties that indicate whether it had any validation errors and what the full text of the error message read, which can be called during the orchestration and used to create the computer interface desired to be displayed to the user. A wide variety of ways of using the validation procedure in conjunction with the BRE to aid in performing various message and file processing tasks may be implemented using the principles disclosed herein, including correcting of data values identified as being in error like those methods disclosed in this document.

In places where the description above refers to particular implementations of ESB business activity monitoring systems and implementing components, sub-components, methods and sub-methods, it should be readily apparent that a number of modifications may be made without departing from the spirit thereof and that these implementations, implementing components, sub-components, methods and sub-methods may be applied to other ESB business activity monitoring systems.

What is claimed is:

1. A method of creating a validation policy, the method comprising:
generating a validation policy for use with a business rule engine (BRE), the BRE comprised in a computer associated with an application server system;
generating an assertion rule comprised in the validation policy to create an enumerator;
generating an advancing rule comprised in the validation policy that asserts the enumerator to the BRE as a fact; and
generating one or more evaluation rules comprised in the validation policy where each of the one or more evaluation rules comprises a check format function and an error formatting function;
wherein the check format function is configured to use an XPath statement to return one or more data values from the enumerator and further comprises one or more validation patterns and a corresponding one or more validation functions that are configured to verify whether the one or more data values returned correspond with a pattern comprised in one of the one or more validation patterns and the one or more validation functions; and
wherein the error formatting function is configured to, in response to one or more of the one or more data values failing to be verified by the check format function:
generate an error message comprising the one or more of the one or more data values that failed to be verified and an indication of which of the one or more validation patterns that was failed; and
generate a computer interface to display the error message.

2. The method of claim 1, wherein the computer interface is selected from the group consisting of a popup window, a formatted electronic message, a web page, a text message, and any combination thereof.

3. The method of claim 1, wherein the one or more evaluation rules comprise vocabulary items.

4. The method of claim 3, wherein the vocabulary items comprise the one or more validation patterns and the one or more validation functions.

5. The method of claim 1, wherein the validation patterns are selected from the group consisting of telephone number formats, credit card number formats, time formats, date formats, Internet Protocol (IP) address formats, email address formats, social security number formats, employer identification number formats, postal code formats, and any combination thereof.

6. The method of claim 1, wherein the validation functions are selected from the group consisting of checking data formats, checking data length, checking data maximum length, checking, data minimum length, XPath statements, and any combination thereof.

7. The method of claim 4, wherein the error formatting function is a validation function comprised in the vocabulary items selected from the group consisting of creating format error information, creating length range error information, creating maximum length error information, creating minimum length error information, and any combination thereof.

8. The method of claim 1, wherein the one or more validation patterns are one of regular expressions and friendly expressions.

9. A method of validating data in one of a message and a file, the method comprising:
receiving one of a message and a file from a computer associated with an application server system;
in response to receiving, calling a validation policy using a business rule engine (BRE), the BRE comprised in a computer associated with the application server system;
executing an assertion rule comprised in the validation policy on the one of the message and the file to load one or more data values comprised in the one of the message and the file into an enumerator;
executing an advancing rule comprised in the validation policy to assert the one or more data values comprised in the enumerator to the BRE as a fact; and executing one or more evaluation rules comprised in the validation policy where each of the one or more evaluation rules comprises a check format function and an error formatting function by:
   executing an XPath statement comprised in the check format function to return one or more data values from the enumerator;
   verifying whether the one or more data values returned correspond with a pattern corresponding with one or more of one or more validation patterns and one or more validation functions comprised in the check format function;
   in response to one or more data values failing to be validated by the check format function:
      generating an error message using the error formatting function where the error message comprises the one or more data values that failed and an indication of which of the one or more validation patterns that failed; and
      generating a computer interface to display the error message.

10. The method of claim 9, wherein the computer interface is selected from the group consisting of a popup window, a formatted electronic message, a web page, a text message, and any combination thereof.

11. The method of claim 9, wherein the one or more evaluation rules comprise vocabulary items.

12. The method of claim 11, wherein the vocabulary items comprise the one or more validation patterns and the one or more validation functions.

13. The method of claim 9, wherein the validation patterns are selected from the group consisting of telephone number formats, credit card number formats, time formats, date formats, Internet Protocol (IP) address formats, email address formats, social security number formats, employer identification number formats, postal code formats, and any combination thereof.

14. The method of claim 9, wherein the validation functions are selected from the group consisting of checking data formats, checking data length, checking data maximum length, checking, data minimum length, XPath statements, and any combination thereof.

15. The method of claim 12, wherein the error formatting function is a validation function comprised in the vocabulary items selected from the group consisting of creating format error information, creating length range error information, creating maximum length error information, creating minimum length error information, and any combination thereof.

16. The method of claim 9, wherein the one or more validation patterns are one of regular expressions and friendly expressions.

* * * * *